(12) United States Patent
Axelsson

(10) Patent No.: US 12,060,289 B2
(45) Date of Patent: Aug. 13, 2024

(54) METHODS, SYSTEMS AND DEVICE FOR CONTROLLING BIOLOGICAL TREATMENT PROCESSES AND SYSTEMS

(71) Applicant: BIOTERIA TECHNOLOGIES AB, Täby (SE)

(72) Inventor: Niklas Axelsson, Täby (SE)

(73) Assignee: Bioteria Technologies AB, Täby (SE)

( * ) Notice: Subject to any disclaimer, the term of this patent is extended or adjusted under 35 U.S.C. 154(b) by 394 days.

(21) Appl. No.: 17/622,137

(22) PCT Filed: Jun. 26, 2020

(86) PCT No.: PCT/SE2020/050674
§ 371 (c)(1),
(2) Date: Dec. 22, 2021

(87) PCT Pub. No.: WO2020/263173
PCT Pub. Date: Dec. 30, 2020

(65) Prior Publication Data
US 2022/0315464 A1    Oct. 6, 2022

(30) Foreign Application Priority Data
Jun. 26, 2019 (SE) .................... 1950789-6

(51) Int. Cl.
*C02F 3/00* (2023.01)
*C02F 3/06* (2023.01)
*C02F 3/34* (2023.01)

(52) U.S. Cl.
CPC ............ *C02F 3/006* (2013.01); *C02F 3/06* (2013.01); *C02F 3/343* (2013.01); *C02F 3/348* (2013.01); *C02F 2209/00* (2013.01)

(58) Field of Classification Search
CPC .. C02F 3/006; C02F 3/06; C02F 3/343; C02F 3/348; C02F 2209/00; C02F 3/02;
(Continued)

(56) References Cited

U.S. PATENT DOCUMENTS

| 5,235,963 A | 8/1993 | Strause |
| 7,288,187 B1 | 10/2007 | Bovaird |

(Continued)

FOREIGN PATENT DOCUMENTS

| CA | 3096817 A1 * | 10/2019 | ............ B01D 17/02 |
| CA | 3144584 A1 | 12/2020 | |

(Continued)

OTHER PUBLICATIONS

Office Action from Swedish patent application No. 1950789-6, dated Jul. 16, 2020.
(Continued)

*Primary Examiner* — Daniel Pihulic
(74) *Attorney, Agent, or Firm* — Faegre Drinker Biddle & Reath LLP

(57) ABSTRACT

A method, a system, and a wastewater treatment system includes a biological treatment zone for biologically treating fat, oil and grease by adding a culture of microorganisms for partial biodegradation of the fat, oil and grease and/or breaking down the fat, oil and grease. The wastewater system includes a control system, an air injection and distribution system for improving and controlling the biological treatment process and at least one sensor. The at least one sensor may be configured to obtain sensor data, audio data and/or image data, and the control system may be configured to determine the thickness of a layer of fat, oil and grease on the surface of the biological treatment zone.

23 Claims, 4 Drawing Sheets

(58) Field of Classification Search
CPC ........... C02F 3/00; B08B 9/027; Y02A 50/20; Y02W 10/10; Y02W 10/37; F24C 15/2057; C12M 1/36
See application file for complete search history.

(56) References Cited

U.S. PATENT DOCUMENTS

| | | |
|---|---|---|
| 8,746,231 B2 | 6/2014 | Kellogg et al. |
| 2003/0190742 A1 | 10/2003 | Whiteman |
| 2010/0193430 A1 | 8/2010 | Whiteman |
| 2012/0125840 A1 | 5/2012 | Smith |
| 2012/0132586 A1 | 5/2012 | Smith |
| 2018/0304316 A1 | 10/2018 | Khandjian et al. |
| 2019/0368747 A1 | 12/2019 | Rousseau et al. |
| 2022/0315464 A1* | 10/2022 | Axelsson ............ F24C 15/2057 |
| 2022/0340460 A1* | 10/2022 | Axelsson ................ B08B 9/027 |

FOREIGN PATENT DOCUMENTS

| | | | |
|---|---|---|---|
| CA | 3144589 A1 | 12/2020 | |
| CA | 3144589 A1 * | 12/2020 | ............ B08B 9/027 |
| DE | 102004036837 A1 | 3/2006 | |
| EP | 1775035 A1 | 4/2007 | |
| EP | 3990834 A1 | 5/2022 | |
| ES | 2237422 T3 | 8/2005 | |
| FR | 2851941 A1 | 9/2004 | |
| JP | H07308691 A | 11/1995 | |
| JP | H07308692 A | 11/1995 | |
| JP | H10296294 A | 11/1998 | |
| JP | 2001060101 A | 3/2001 | |
| PT | 2333446 T | 9/2017 | |
| WO | 2008/157418 A1 | 12/2008 | |
| WO | 2009/108996 A1 | 9/2009 | |
| WO | 2014/000868 A1 | 1/2014 | |
| WO | 2017/005659 A1 | 1/2017 | |
| WO | 2018/129619 A1 | 7/2018 | |
| WO | 2018/156149 A1 | 8/2018 | |
| WO | WO-2019/098255 A1 | 5/2019 | |
| WO | 2020/263172 A1 | 12/2020 | |
| WO | 2020/263173 A1 | 12/2020 | |
| WO | WO-2020263172 A1 * | 12/2020 | ............ B08B 9/027 |
| WO | WO-2020263173 A1 * | 12/2020 | ............ B08B 9/027 |

OTHER PUBLICATIONS

Extended European Search Report issued in European patent application No. 20830621.7, dated Jun. 26, 2023.

International Preliminary Report on Patentability received for PCT Patent Application No. PCT/SE2020/050673, mailed on Sep. 30, 2021, 20 pages.

International Search Report and Written Opinion received for PCT Patent Application No. PCT/SE2020/050673, mailed on Jul. 16, 2020, 20 pages.

Mudie S. and Vahdati M. 'Fat, oil and grease reduction in commercial kitchen ductwork: A novel biological approach', Waste Management, 2017, vol. 61, pp. 28-39.

* cited by examiner

METHODS, SYSTEMS AND DEVICE FOR CONTROLLING BIOLOGICAL TREATMENT PROCESSES AND SYSTEMS

CROSS-REFERENCE TO PRIOR APPLICATIONS

This application is a § 371 National Stage Application of PCT International Application No. PCT/SE2020/050674 filed Jun. 26, 2020, which claims priority to Swedish Patent Application No. 1950789-6 filed on Jun. 26, 2019, both of which are incorporated herein in their entirety.

TECHNICAL FIELD

Generally, the technology disclosed relates to improved systems and methods for bioprospecting and the control of a biological treatment process.

The technology disclosed relates to the search for new compositions of microorganisms by determining that a liquid sample containing a culture of microorganisms should be collected from an ongoing biological treatment process in a wastewater treatment system where the decision to collect a sample is based on obtained sensor data and, in particular, The technology disclosed also relates to methods, a system and an apparatus for sharing data and/or information between sub-systems and/or a master control unit for the purpose of controlling a treatment process in a system or sub-system, where the system or sub-system is using microorganisms for the treatment of wastewater, or the treatment of waste based on the determined thickness of the layer of fat, oil and grease and/or rate of increase per unit of time of the thickness of the layer of fat, oil and grease on the surface of the biological treatment zone.

The technology disclosed further relates to methods, a system and an apparatus for sharing data and/or information between sub-systems and/or a master control unit for the purpose of controlling a treatment process in a system or sub-system, where the system or sub-system is using microorganisms for the treatment of wastewater, or the treatment of waste.

The technology disclosed further relates to methods, systems comprising at least one of sensor data, captured image data, process variables, IoT (Internet of Things) and artificial intelligence for changing a treatment process.

The technology disclosed involves adding a beneficial composition of microorganism and/or changing at least one process variable of at least one process for the treatment of wastewater in a wastewater treatment system, for the treatment of waste, such as solid and/or liquid waste, and/or in a waste management system.

In particular, the technology disclosed relates to methods, systems comprising at least one of sensor data, image data, process variables, IoT (Internet of Things) and artificial intelligence for changing a treatment process which involves adding a composition/culture of microorganism to a treatment process and/or changing at least one process variable of at least one process for the treatment of wastewater in a wastewater treatment system such as a wastewater tank or treatment plant, or for the treatment of waste in a waste management system.

BACKGROUND

Civilizations have historically flourished around major water systems, metropolises own their success to the accessibility of water. Clean water and air are the most vitally necessary yet frequently overlooked resources necessary for our survival. Due to the higher prevalence of human impacts on the environment, water and air pollution has become an increasingly significant problem. The wastewater generated by anthropogenic influences need to be processed daily to ensure clean water consumption.

The biological treatments of wastewater (e.g. trickling bio-filter, activated sludge process, suspended growth treatment systems) are among the oldest and most well characterized technologies. Currently, industrial wastewater is typically treated by aerobic systems that remove contaminants prior to discharging the water to river, lake or underground. Although the aerobic system is effective at cleaning waters, a major drawback is that these treatment systems require large amounts of electricity for proper operation.

Most municipalities with municipal sewage nets, receiving wastewater from restaurants and food processing industries, with high fat content in the wastewater, are limiting the fat concentration in the wastewater and demand installation of fat separators to maintain the limit. Fat separators take care of the separable fat, mainly.

There are many forms of septic treatment systems. Normally, septic systems treat only sewage. Waste fat, oil, and grease (FOG) is diverted to a fat separator, or grease trap. Grease is treated separately before being transported through an outlet. Mechanical treatment may be used in some septic systems to augment chemical treatment of effluents so that they may be safely sent to a septic tile field.

Large amounts of organic solid wastes are produced in many towns and cities all over the world, and treatment methods are often limited by solids handling requirements for adequate sterilization of these large amounts of heavy, solid waste. Accordingly, there is a need for improved systems and methods for digestion and composting of solid wastes with limited solids handling requirements.

Bioprospecting is a term that refers to the search for novel products or organisms of economic importance from the world's biota. The current methods for search for novel cultures of microorganisms are very complex and time consuming and often requires a lot of experimental activities and often requires the continuous addition of nutrients and other substances in addition to the culture of microorganisms.

It is an object of the invention to provide methods, systems and device for an easy to implement solution for bioprospecting in a wastewater treatment system without any complex analyses and which is less time-consuming and requires less or no addition of nutrients and other substances in addition to the culture of microorganisms.

PROBLEMS WITH THE PRIOR ART

Wastewater from toilets and urinals is often termed black water. It is composed of feces, urine and water, but also paper, or cellulose. Urine contains more than 80% of daily produced human nitrogen (urea) dissolved in water. Feces contain about 50% of the daily produced human carbon in solid form and more than 50% of the phosphorus and 10% of the nitrogen. Almost the whole range of pollutants can be found here: carbon, phosphorus and potassium primarily in the feces, nitrogen mainly in the urine. Moreover, black water contains pathogenic bacteria from the human intestinal tract (so-called coliform bacteria). The bacteria which are contained in the sedimented sludge, can be completely killed by subsequent fermentation and composting, the bacteria contained in the water must be sterilized to be killed completely.

Home and restaurant kitchens, as well as catering and institutional food services can spend thousands of dollars to repair the damage caused by the build-up of FOG. A clogged drain can cause a home to be temporarily inhabitable and force a business to close until the sewer drain is cleared and the damage is cleaned and repaired. The advantages to keeping drains free of any build up before a blockage occurs are clear, however the most common preventative measures often include the use of corrosive chemicals that are dangerous to handle and store, and which are not environmentally sound.

The problems with fat waste are not limited to individual buildings, municipalities also have to contend with the build-up of fat in shared sanitary sewer lines as well as in treatment plants and any other effluent transfer and storage facilities. A municipality's expenses associated with keeping the accumulation of fat minimal through the use of physical methods can be substantial. These costs, however, are preferable to having to clean or replace sections of sewer due to the severe accumulation of insoluble waste. These blockages, which are often caused by fat, can cause a sanitary sewer overflow (an "SSO"). An SSO is not only expensive to fix and clean itself, but in the event of an SSO, the governmental authorities and agencies may issue substantial fines to the governing municipality. Additionally, if such an overflow contaminates the drinking water supply, the resulting public health emergency will require, at the least, the issuance of a boil order, where all affected people need to boil water before consuming it. In more extreme cases, boiling may be insufficient and clean water will need to be brought in, or the people moved out, until the water is again made drinkable.

In a fat separator, the fat is separated as a solid comparatively hard cake contaminated with other substances. When the fat separator's space for fat is full, or when the fat cake created on the surface of the wastewater is so thick that the fat separation process is no longer sufficiently efficient, the fat separator, or tank, needs to be emptied, and/or the fat cake created on the surface of the wastewater must be removed, e.g. by emptying the wastewater in the fat separator. Before emptying, the fat cake is typically broken up. In state of the art fat separators, or grease traps, it frequently happens that this breaking up does not became good enough to allow for a substantial portion of the fat in the fat cake to be eliminated. Remaining fat pieces follow the wastewater and gather in the parts of the sewer where the current is weak, and form with other contaminant stoppages, causing at least as large problems as the fat stoppages mentioned.

The separated fat contains large amounts of both unsaponified and saponified fat. Such a mixture is very unfavourable from the reworking point of view, especially as the reworking is disturbed by the contaminants mentioned. Usually the separated fat must be disposed of. Many trials have been done to decompose the fat, to be more easily handled, by using enzymes and several other chemicals. The decomposition products, which are soluble or form stabile dispersions in water, do not cause problems in the sewer and give no problems in the sewage works. Exceptions from this rule are fatty acids, which are said to cause growth of so-called filiform bacteria, which may cause sludge swelling and sludge escape. The success with enzymes has been limited. Chemicals of other kinds are often causing problems in the conduits and in the sewage works.

Large amounts of organic solid wastes are produced in many towns and cities all over the world, and treatment methods are often limited by solids handling requirements for adequate sterilization of these large amounts of heavy, solid waste. Accordingly, there is a need for improved systems and methods for digestion and composting of solid wastes with limited solids handling requirements.

It is therefore an object of the invention to provide methods, systems and device for an easy to implement solution for bioprospecting in a wastewater treatment system without any complex analyses and which is less time-consuming and requires less or no additions of nutrients or other substances in addition to the added culture of microorganisms.

SUMMARY

The technology disclosed relates to systems and methods for improved bioprospecting and improved control of a biological treatment process in a wastewater treatment system or waste treatment system.

The technology disclosed relates to the search for new compositions of microorganisms by determining that a liquid sample containing a culture of microorganisms should be collected from an ongoing biological treatment process in a wastewater treatment system or waste treatment system, where the decision to collect a sample is based on obtained sensor data and, in particular, the determined thickness of the layer of fat, oil and grease on the surface of the wastewater tank.

The technology disclosed also relates to methods, a system and an apparatus for sharing data and/or information between sub-systems and/or a master control unit for the purpose of controlling a treatment process in a system or sub-system, where the system or sub-system is using microorganisms for the treatment of wastewater, or the treatment of waste based on the determined thickness of the layer of fat, oil and grease and/or rate of increase per unit of time of the thickness of the layer of fat, oil and grease on the surface of the biological treatment zone.

The technology disclosed relates to a system comprising a biological treatment zone or surface area for biologically treating fat, oil and/or grease by adding a culture of microorganisms for partial biodegradation of the fat, oil and/or grease and/or breaking down the fat, oil and/or grease, wherein the system comprises a control system or unit and at least one sensor, camera and/or microphone for obtaining sensor data related to the biological treatment process, and wherein the control system or unit may be configured to determine that a change in the biological treatment process has occurred at least partly based on the sensor data.

In aspects, the technology disclosed relates to a wastewater treatment system comprising a biological treatment zone for biologically treating fat, oil and grease by adding a culture of microorganisms for partial biodegradation of the fat, oil and grease and/or breaking down the fat, oil and grease. The wastewater system comprises a control system and at least one sensor. The may further comprise an air injection and distribution system for improving and controlling the biological treatment process and. The at least one sensor is configured to obtain sensor data, audio data and/or image data and the control system may be configured to determine the thickness of a layer of fat, oil and grease on the surface of the biological treatment zone.

In embodiments, the control system is further configured to determine the rate of increase per unit of time of the thickness of the layer of fat, oil and grease on the surface of the biological treatment zone based on the obtained audio and/or image data and previously obtained sensor data, audio and/or image data indicating the thickness of the layer of fast, oil and grease on the surface of the biological treatment zone.

In embodiments, the control system is configured to determine, e.g. automatically determine, that a liquid sample containing a culture of microorganisms should be collected from the biological treatment zone based on the determined thickness of the layer of fat, oil and grease and/or rate of increase per unit of time of the thickness of the layer of fat, oil and grease on the surface of the biological treatment zone.

In embodiments, the control system is configured to determine, e.g. automatically determine, that a liquid sample containing a culture of microorganisms should be collected based on the determined thickness of the layer of fat, oil and grease and/or rate of increase per unit of time of the thickness of the layer of fat, oil and grease on the surface of the biological treatment zone is below a certain value.

In embodiments, the control system is configured to determine, e.g. automatically determine, that a liquid sample containing a culture of microorganisms should be collected is based on the determined thickness of the layer of fat, oil and grease and/or rate of increase per unit of time of the thickness of the layer of fat, oil and grease on the surface of the biological treatment zone is below a certain pre-determined threshold value.

In embodiments, the control system is further configured to change at least one process variable, process scheme and/or process parameter used for controlling the biological treatment process based on the determined thickness of the layer of fat, oil and grease and/or rate of increase per unit of time of the thickness of the layer of fat, oil and grease on the surface of the biological treatment zone.

In embodiments, the control system is further configured to control, e.g. automatically control, the amount of air injected into the biological treatment zone per unit of time by the air injection and distribution system based on the determined thickness of the layer of fat, oil and grease and/or rate of increase per unit of time of the thickness of the layer of fat, oil and grease on the surface of the biological treatment zone.

In embodiments, the control system is further configured to receive control data or instruction data from another remotely located wastewater treatment system and/or a master control unit. The control system may then be further configured to use the received control data to determine, e.g. automatically determine, that a liquid sample containing a culture of microorganisms should be collected from the biological treatment zone.

In embodiments, the control system is further configured to receive control data or instruction data from another remotely located wastewater treatment system and/or a master control unit. The control system may then be further configured to use the received control data or instruction data to change, e.g. automatically change, at least one process variable, process scheme and/or process parameter for controlling the biological treatment process.

In embodiments, the control system is further configured to receive control data or instruction data from another remotely located wastewater treatment system and/or a master control unit. The control system may then be further configured to use the received control data or instruction data to change, e.g. automatically change, the amount of air injected into the biological treatment zone per unit of time by the air injection and distribution system.

In embodiments, the at least one sensor includes at least one of a camera, an optical sensor, a microphone, an acoustic sensor, an ultrasonic sensor, and a radar sensor for obtaining the sensor data, audio data and/or image data.

In embodiments, the control system is configured to use at least one of soft sensor data, historic data, machine learning algorithms, deep learning algorithms and artificial intelligence for processing the obtained sensor data, audio data and/or image data in order to determine the thickness of the layer of fat, oil and grease and/or rate of increase per unit of time of the thickness of the layer of fat, oil and grease on the surface of the biological treatment zone.

In embodiments, the wastewater treatments system is further configured to transmit the obtained sensor data, audio data and/or image data to a remotely located processor configured to use at least one of soft sensor data, historic data, machine learning algorithms, deep learning algorithms and artificial intelligence for processing the obtained sensor data, audio data and/or image data to determine the thickness of the layer of fat, oil and grease and/or rate of increase per unit of time of the thickness of the layer of fat, oil and grease on the surface of the biological treatment zone.

In embodiments, the control system is further configured to determine that a liquid sample containing a culture of microorganisms should be collected from the biological treatment zone is, in addition to the determining of the thickness of the layer of fat, oil and grease on the surface of the biological treatment zone, also based on sensor data obtained by a temperature sensor indicating a certain temperature of the wastewater in the biological treatment zone and/or a certain rate of increase or decrease of the temperature in the wastewater in the biological treatment zone.

In aspects, the technology disclosed relates to a method in a wastewater treatment system for biologically breaking down fat, oil and grease by adding a culture of microorganisms to a biological treatment zone of the biological treatment system, where the biological treatment system comprising a control system, an air injection and distribution system for improving and controlling the biological treatment process and at least one sensor. The method may then comprise the steps of:

a) obtaining sensor data, audio data and/or image data from the at least one sensor, wherein the sensor data, audio data and/or image data is indicating the current thickness of a layer of fat, oil and grease on the surface of the biological treatment zone; and b) determining, by the control system or a remotely located control unit communicatively coupled to the control system, the thickness of the layer of fat, oil and grease and/or rate of increase per unit of time of the thickness of the layer of fat, oil and grease on the surface of the biological treatment zone, wherein the rate of increase per unit of time of the thickness of the layer of fat, oil and grease is determined based on the obtained sensor data, audio data and/or image data and previously obtained sensor data, audio data and/or image data indicating the thickness of the layer of fast, oil and grease on the surface of the biological treatment zone.

In embodiments, the method is further comprising:

c) determining, by the control system, that a liquid sample containing a culture of microorganisms should be collected from the biological treatment zone, wherein the determining is based on the determined thickness of the layer of fat, oil and grease and/or rate of increase per unit of time of the thickness of the layer of fat, oil and grease.

In embodiments, the step of determining that a liquid sample containing a culture of microorganisms should be collected from the biological treatment zone is based on the determined thickness of the layer of fat, oil and grease and/or rate of increase per unit of time of the thickness of the layer of fat, oil and grease is below a certain value.

In embodiments, the step of determining the thickness of the layer of fat, oil and grease and/or rate of increase per unit of time of the thickness of the layer of fat, oil and grease on the surface of the biological treatment zone is at least partly performed by a processor using at least one of soft sensor data, historic data, machine learning algorithms, deep learning algorithms and artificial intelligence for processing the obtained sensor data, audio data and/or image data in order to determine the thickness of the layer of fat, oil and grease and/or rate of increase per unit of time of the thickness of the layer of fat, oil and grease on the surface of the biological treatment zone.

In embodiments, the sensor data, audio data and/or image data is transmitted to a remotely located processor and the step of determining the thickness of the layer of fat, oil and grease and/or rate of increase per unit of time of the thickness of the layer of fat, oil and grease on the surface of the biological treatment zone is at least partly performed by the remotely located processor using at least one of soft sensor data, historic data, machine learning algorithms, deep learning algorithms and artificial intelligence for processing the obtained sensor data, audio data and/or image data in order to determine the thickness of the layer of fat, oil and grease and/or rate of increase per unit of time of the thickness of the layer of fat, oil and grease on the surface of the biological treatment zone.

In embodiments, the method is further comprising:
d) controlling, by the control system, the amount of air injected into the biological treatment zone per unit of time by the air injection and distribution system based on the determined thickness of the layer of fat, oil and grease and/or rate of increase per unit of time of the thickness of the layer of fat, oil and grease on the surface of the biological treatment zone.

In embodiments, the method is further comprising:
e) receiving, by the control system and from another wastewater treatment system and/or a master control unit, control data or instruction data; and
f) determining, by the control system, that a liquid sample containing a culture of microorganisms should be collected from the biological treatment zone, wherein the determining is based on the received control data or instruction data.

In embodiments, the method is further comprising:
g) receiving, by the control system and from another wastewater treatment system and/or a master control unit, control data or instruction data; and
h) controlling, by the control system, the amount of air injected into the biological treatment zone per unit of time by the air injection and distribution system based on the received control data or instruction data.

In embodiments, the step of determining that a liquid sample containing a culture of microorganisms should be collected from the biological treatment zone is, in addition to the determining of the thickness of the layer of fat, oil and grease on the surface of the biological treatment zone, also based on sensor data obtained by a temperature sensor indicating a certain temperature of the wastewater in the biological treatment zone and/or a certain rate of increase or decrease of the temperature in the wastewater in the biological treatment zone.

In embodiments, the control system or unit is configured to determine that at least one of a change of the composition of microorganisms and a spontaneous mutation of the culture of microorganisms initially added to the biological treatment process has occurred.

In embodiments, the control system or unit is configured to at least one of change at least one process variable, process scheme and/or process parameter used for controlling the biological treatment process and determine that a sample containing a culture of microorganisms may or should be collected from the biological treatment zone or surface area.

In embodiments, the control system or unit is further configured to determine that the culture of microorganisms is performing well and that a sample containing the culture of microorganisms may or should be collected from the biological treatment zone or surface area, and wherein the determining that a sample of the culture of microorganisms may or should be collected is at least partly based on the sensor data obtained by the at least one sensor device, camera and/or microphone.

In embodiments, the control system or unit is further configured to identify and/or store at least one process variable, process scheme and/or process parameter related to an ongoing biological treatment process determined to be performing well and which involves the collected sample containing the culture of microorganisms.

In embodiments, the control system or unit is further configured to determine that the identified and/or stored at least one process variable, process scheme and/or process parameter of a first biological treatment process may be used in a second biological treatment process in another system for biologically breaking down fat, oil and/or grease to thereby improve or optimize the second biological treatment process using the collected culture of microorganisms.

In embodiments, the control system or unit of the system is configured to send data or information at least partly based on the obtained sensor data, and wherein the control system or unit is configured to send the data or information to at least one of another system for biologically treating fat, oil and/or grease by adding a culture of microorganisms and a remotely located master control unit for controlling a plurality of sub-systems for biologically treating fat, oil and/or grease.

In embodiments, the control system or unit of the system is configured to receive control or instruction data from at least one other remotely located system or sub-system for biologically treating fat, oil and/or grease and a remotely located master control unit for controlling a plurality of systems for biologically treating fat, oil and/or grease, and wherein the control system or unit is further configured to determine that a sample containing a culture of microorganisms may or should be collected at least partly based on the control or instruction data received from at least one of the at least one other remotely located system or sub-system for biologically treating fat, oil and/or grease and the remotely located master control unit.

In embodiments, the technology disclosed relates to a system that may be configured to detect a change in a biological process at least partly based on obtained sensor data related to the biological process, where the obtained sensor data may explicitly indicate a change in the biological process. An indication of a change in the biological process, which is at least partly based on the obtained sensor data, may trigger the collecting of a sample and, optionally, a further analysis of the collected sample. The analysis of the sample may determine if a change in the microculture has occurred, e.g. a change in the composition of microorganisms (e.g. a change in the ratio of different microorganisms which may include the composition of microorganisms initially added to the biological treatment process) and/or a spontaneous mutation of the microculture initially added to biological treatment process, has occurred that could be used as either a starting culture in any other biosystem, e.g. at other sites, or as a sample for further product development of a microculture in the collected sample. The system, or a master control unit communicatively coupled to the system, of the technology disclosed may be configured to determine, at least partly based on obtained sensor data, that a change in the biological process has occurred. The collected sample containing the microculture, or culture of microorganisms, may then be collected from a biological treatment zone of the system and the collected sample may be suitable for biologically treating fat, oil and/or grease (FOG), suitable for breaking down fat, oil and/or grease and/or suitable for partial biodegradation of fat, oil and/or grease.

In embodiments, the technology disclosed relates to methods for detecting a change in a biological process at least partly based on obtained sensor data related to the biological process, where the obtained sensor data may explicitly indicate a change in the biological process. A change in the biological process which may be determined at least based on the obtained, e.g. collected or received sensor data, may trigger the collecting of a sample and, optionally, and may further trigger the performing of an analysis of the collected sample. The performed analysis of the sample may determine if a change in the microculture has occurred, e.g. a change in the composition of microorganisms (e.g. a change in the ratio of different microorganisms which may include microorganism in the composition of microorganisms initially added to the biological treatment process) and/or a spontaneous mutation of the microculture which was initially added to the biological treatment process, has occurred that could be used as either a starting culture in any other biosystem, e.g. at other sites, or as a sample for further product development of a microculture in the collected sample. The system, or a master control unit communicatively coupled to the system, of the technology disclosed may determine, at least partly based on obtained sensor data, that a change in the biological process has occurred. The collected sample containing the microculture, or culture of microorganisms, may then be collected from a biological treatment zone of the system and the collected sample may be suitable for biologically treating fat, oil and/or grease (FOG), e.g. suitable for breaking down fat, oil and/or grease and/or suitable for partial biodegradation of fat, oil and/or grease. In certain embodiments, the master control unit may be configured to at least one of receive and exchange data or information directly from at least one other device or system which is not a biological treatment system.

The technology disclosed relates to a method in a biological treatment system for biologically breaking down fat, oil and/or grease by adding a culture of microorganisms comprising at least one sensor device, camera and/or microphone, the method comprising the steps of:
  a) obtaining sensor data from the at least one sensor device, camera and/or microphone, and
  b) changing at least one process variable, process scheme and/or process parameter for controlling the biological treatment process at least partly based on the sensor data obtained by the at least one sensor device, camera and/or microphone.

The technology disclosed relates to a method in a biological treatment system for biologically breaking down fat, oil and/or grease by adding a culture of microorganisms, the method comprising the steps of:
  c) receiving control or instruction data from at least one of another remotely located system or control unit, and
  d) changing at least one process variable, process scheme and/or process parameter for controlling the biological treatment process at least partly based on the received control or instruction data.

The technology disclosed relates to a method in a biological treatment system for biologically breaking down fat, oil and/or grease by adding a culture of microorganisms comprising at least one sensor device, camera and/or microphone, the method comprising the steps of:
  e) obtaining sensor data from the at least one sensor device, camera and/or microphone, and
  f) determining that a culture of microorganisms is performing well and that a sample containing the culture of microorganisms may or should be collected from the biological treatment zone or surface area of a biological treatment zone or surface area of the biological treatment system, wherein the determining is at least partly based on the sensor data obtained by the at least one sensor device, camera and/or microphone.

In embodiments, the method further comprises the step of sending data and/or providing information to a remotely located master control unit that a sample containing the culture of microorganisms may or should be collected from the biological treatment zone or surface area of the biological treatment zone or surface area of the biological treatment system.

In embodiments, the technology disclosed relates to system comprising a biological treatment zone or surface area for biologically treating fat, oil and/or grease by adding a culture of microorganisms for breaking down the fat, oil and/or grease (FOG). The system may comprise a control system or unit and at least one sensor, camera and/or microphone for obtaining sensor data, e.g. image data or audio data, related to the biological treatment process for breaking down the fat, oil and/or grease. The control system or unit may be configured to at least one of change at least one process variable, process scheme and/or process parameter related to the biological treatment process, e.g. as at least one process-related parameter value, and determine that a sample containing a spontaneous mutation of the culture of microorganisms initially added to the biological treatment process should be collected from the biological treatment zone or surface area. In different embodiments, the system may be a wastewater treatment system, a waste management system, a fraction collector, a fraction separator, or a treatment plant.

In embodiments, the control system or unit of the system for breaking down fat, oil and/or grease (FOG) is configured to receive or collect the sensor data from the at least one sensor device, camera and/or microphone.

In embodiments, the control system or unit is configured to continuously and/or periodically receive or collect the sensor data from the at least one sensor device, camera and/or microphone.

In embodiments, the control system or unit is configured at least one of identify and store at least one process variable, process scheme and/or process parameter related to the ongoing biological treatment process.

In embodiments, the control system or unit is configured at least one of identify and store at least one process variable, process scheme and/or process parameter controlling the biological treatment process at least partly based on sensor data obtained by the at least one sensor device, camera and/or microphone.

In embodiments, the control system or unit of a system for biologically treating fat, oil and/or grease is configured to change at least one process variable, process scheme and/or process parameter for controlling the biological treatment process at least partly based on sensor data obtained by the at least one sensor device, camera and/or microphone.

In certain embodiments, the decision by the control system or unit of a system for biologically treating fat, oil and/or grease whether to change at least one process variable, process scheme and/or process parameter value may in addition be at least partly based on data or information exchanged with and/or received from at least one other device or system, wherein the other device or system may include at least one of the booking system for at least one restaurant, a weather report system, a control system/unit for monitoring air pollution in air or air streams, a control system/unit for monitoring/detecting the outflow of wastewater from at least one kitchen and/or restaurant, and/or a dishwasher control unit.

In embodiments, the control system or unit of the system for breaking down fat, oil and/or grease may be configured to send data or information at least partly based on the obtained at least one of sensor data, image data and audio data. The control system or unit may then be configured to send the data or information to at least one of another system for biologically treating down fat, oil and/or grease by adding microorganisms and a remotely located master control unit for controlling a plurality of systems for biologically treating fat, oil and/or grease. The other system may then be a wastewater treatment system, a waste management system, a fraction collector, a fraction separator, or a treatment plant.

In certain embodiments, the decision by the control system or unit of a system for biologically treating fat, oil and/or grease whether to send data or information to at least one of another system for biologically treating down fat, oil and/or grease to change at least one process variable, process scheme and/or process parameter value may in addition be at least partly based on data or information exchanged with and/or received from at least one other device or system, wherein the at least one other device or system may include at least one of the booking system for at least one restaurant, a weather report system, a control system/unit for monitoring air pollution in air or air streams, a control system/unit for monitoring/detecting the outflow of wastewater from at least one kitchen and/or restaurant, and/or a dishwasher control unit.

In embodiments, the control system or unit of the system for breaking down fat, oil and/or grease is further configured to determine that a spontaneous mutation of the culture of microorganisms initially added to the treatment process is performing well and that a sample containing the spontaneous mutation of the culture of microorganisms may or should be collected from the biological treatment zone or area. The control unit or system may then be configured to determine, e.g. automatically determine without any human intervention, that a sample of the spontaneous mutation of the culture of microorganisms should be collected at least partly based on sensor data obtained by at least one sensor device, camera and/or microphone of the system.

In certain embodiments, the determining by the control system or unit of a system that a spontaneous mutation of the culture of microorganisms initially added to the treatment process is performing well and that a sample containing the spontaneous mutation of the culture of microorganisms may or should be collected from the biological treatment zone or area may be at least partly based on data or information exchanged with and/or received from at least one other device or system, wherein the at least one other device or system may include at least one of the booking system for at least one restaurant, a weather report system, a control system/unit for monitoring air pollution in air or air streams, a control system/unit for monitoring/detecting the outflow of wastewater from at least one kitchen and/or restaurant, and/or a dishwasher control unit.

In embodiments, the master control unit, e.g. remotely located from at least one sub-system for biologically treating fat, oil and/or grease, for controlling a plurality of sub-systems for breaking down fat, oil and/or grease, and/or for partial biodegradation of fat, oil and/or grease, is further configured to determine that a change in the bioprocess has occurred, e.g. a change in the composition of microorganisms and/or that a spontaneous mutation of the culture of microorganisms initially added to the biological treatment process of one of the sub-systems is performing well, and that a sample containing a culture of microorganisms should be collected from the biological treatment zone or area of that particular sub-system. The master control unit may then be configured to determine, e.g. automatically determine without any human intervention, that a sample of a culture of microorganisms should be collected from the sub-system and the determining by the master control unit may at least partly be based on sensor data obtained by the at least one sensor device, camera and/or microphone of the sub-system is indicating that the biological treatment process is performing well. In example embodiments, the sub-system may then be a wastewater treatment system, a waste management system, a fraction collector, a fraction separator, or a treatment plant. In certain embodiments, the master control unit may be configured to at least one of receive and exchange data or information directly from at least one other device or system which is not a biological treatment system, and the determining by the master control unit that a sample should be collected is at least partly based on the information from the at least one other device or system. As an example, the other device or system may include at least one of a booking system, a weather report system and a dishwasher.

In embodiments, the control system or unit of the system or sub-system is further configured to identify at least one process variable, process scheme and/or process parameter related to the biological treatment process determined to be performing well and which involves the collected sample containing the culture of microorganisms performing well. The culture of microorganism may or may not be a spontaneous mutation of the culture of microorganisms initially added to the biological treatment process. The identified at least one process variable, process scheme and/or process parameter may then be used, or re-used, for controlling another biological treatment process which includes adding the collected sample containing the culture of microorganisms to a biological treatment zone or area of another system for biologically breaking down fat, oil and/or grease. In example embodiments, the system or sub-system and the other system may be a wastewater treatment system, a waste management system, a fraction collector, a fraction separator, or a treatment plant.

In embodiments, the control system or unit of the system is further configured to store at least one process variable, process scheme and/or process parameter related to the biological treatment process determined to be performing well and which involves the collected sample containing the culture of microorganisms. The culture of microorganism may or may not be a spontaneous mutation of the culture of microorganisms initially added to the biological treatment process. The stored at least one process variable, process scheme and/or process parameter may then be used, or re-used, for controlling another biological treatment process which includes adding the collected sample containing the culture of microorganisms to a biological treatment zone or area of another system for biologically breaking down fat, oil and/or grease. In example embodiments, both the system and the other system may be a wastewater treatment system, a waste management system, a fraction collector, a fraction separator, or a treatment plant.

In embodiments, the technology disclosed relates to a system comprising a biological treatment zone or surface area for biologically treating fat, oil and/or grease by adding a culture of microorganisms for breaking down the fat, oil and/or grease, said system comprising a control system or unit and at least one sensor, camera and/or microphone for obtaining sensor data, e.g. image data or audio data, related to the biological treatment process for breaking down the fat, oil and/or grease, wherein said a control system or unit is configured to at least one of change at least one process variable, process scheme and/or process parameter used for controlling the biological treatment process and determine that a sample containing the culture of microorganisms may or should be collected from the biological treatment zone or surface area.

In certain embodiments, the control system or unit is configured to continuously and/or periodically receive or collect said sensor data from said at least one sensor device, camera and/or microphone. In certain embodiments, the control system or unit is further configured at least one of identify and store at least one process variable, process scheme and/or process parameter related to the ongoing biological treatment process. In certain embodiments, the control system or unit is further configured at least one of identify and store at least one process variable, process scheme and/or process parameter related to the biological treatment process at least partly based on said sensor data obtained by the at least one sensor device, camera and/or microphone. In certain embodiments, control system or unit is further configured to change at least one process variable, process scheme and/or process parameter for controlling the biological treatment process at least partly based on said sensor data obtained by the at least one sensor device, camera and/or microphone.

In embodiments, the technology disclosed relates to a system comprising a biological treatment zone or surface area for biologically treating fat, oil and/or grease by adding a culture of microorganisms for breaking down the fat, oil and/or grease, said system comprising a control system or unit configured to determine that a culture of microorganisms is performing well and that a sample containing the culture of microorganisms may or should be collected from the biological treatment zone or surface area, and wherein said determining that a sample containing the culture of microorganisms may or should be collected is at least partly based on said sensor data obtained by the at least one sensor device, camera and/or microphone. In certain embodiments, the control system or unit is further configured to identify and/or store at least one process variable, process scheme and/or process parameter related to an ongoing biological treatment process determined to be performing well and which involves the collected sample containing the culture of microorganisms.

In embodiments, the technology disclosed relates to a system comprising a biological treatment zone or surface area for biologically treating fat, oil and/or grease by adding a culture of microorganisms for breaking down the fat, oil and/or grease, said system comprising a control system or unit is further configured to determine that the identified and/or stored at least one process variable, process scheme and/or process parameter of a first biological treatment process may be used in a second biological treatment process in another system for biologically breaking down fat, oil and/or grease to thereby improve or optimize the second biological treatment process using the collected culture of microorganisms, which may be or may be not a spontaneous mutation of the culture of microorganisms initially added to the first biological treatment process.

In embodiments, the technology disclosed relates to a biological treatment system comprising a biological treatment zone or surface area for biologically treating fat, oil and/or grease by adding a culture of microorganisms for breaking down the fat, oil and/or grease, said system comprising a control system or unit of the system is configured to send data or information at least partly based on the obtained sensor data, and wherein said control system or unit is configured to send said data or information to at least one of another system for biologically treating fat, oil and/or grease by adding a culture of microorganisms and a remotely located master control unit for controlling a plurality of sub-systems for biologically treating fat, oil and/or grease.

In embodiments, the technology disclosed relates to a biological treatment system comprising a biological treatment zone or surface area for biologically treating fat, oil and/or grease by adding a culture of microorganisms for breaking down the fat, oil and/or grease, said system comprising a control system or unit of the system is configured to receive control or instruction data from at least one other remotely located system or sub-system for biologically treating fat, oil and/or grease and a remotely located master control unit for controlling a plurality of systems for biologically treating fat, oil and/or grease, and wherein said control system or unit is further configured to determine that a sample containing the culture of microorganisms may or should be collected at least partly based on the control or instruction data received from at least one of the at least one other remotely located system or sub-system for biologically treating fat, oil and/or grease and the remotely located master control unit.

In embodiments, the control system or unit of the system is configured to receive control or instruction data from the control system or unit of at least one of the other remotely located system for biologically treating fat, oil and/or grease and the remotely located master control unit for controlling a plurality of systems or sub-systems for biologically treating fat, oil and/or grease, and wherein said control system or unit is further configured to change at least partly based on the control or instruction data received from the at least one of another system for biologically treating fat, oil and/or grease and/or the remotely located master control unit.

In embodiments, the technology disclosed relates to a biological treatment system comprising a biological treatment zone or surface area for biologically treating fat, oil and/or grease by adding a culture of microorganisms for breaking down the fat, oil and/or grease, said system comprising a is communicatively coupled to a master control unit remotely located from at least one of a plurality of systems or sub-systems for biologically treating fat, oil and/or grease including a first and a second system, and wherein said master control unit is configured to receive, from at least one of said plurality systems, data related to a treatment or separation process for at least one of said plurality of systems or sub-systems, and wherein said plurality of systems or sub-systems include a plurality of wastewater treatment systems, and/or a plurality of waste management systems. In certain embodiments, the master control unit may be configured to at least one of receive and exchange data or information directly from at least one other device or system which is not a biological treatment system. The master control unit may then be configured to determine by that a sample should be collected is at least partly based on the information from the at least one other device or system. As an example, the other device or system may include at least one of a booking system, a weather report system and a dishwasher.

In embodiments, the technology disclosed relates to a biological treatment system which is communicatively coupled to another remotely located system for biologically treating fat, oil and/or grease by adding a culture of microorganisms for breaking down the fat, oil and/or grease, and wherein said control system or unit is configured to receive at least one of sensor data and control data from said remotely located system, and wherein said control system or unit is further configured to at least one of change at least one process variable and/or parameter related to the biological treatment process and determine that a sample containing a culture of microorganisms should be collected at least partly based on said at least one of sensor data and control data received from said remotely located system. In different embodiments, the biological treatment system is a wastewater treatment system, a waste management system, a fraction collector, a fraction separator, a treatment plant or a system for purifying air In different embodiments, the technology disclosed relates to a method in a biological treatment system for biologically breaking down fat, oil and/or grease by adding a culture of microorganisms comprising at least one sensor device, camera and/or microphone, said method comprising the steps of:
  a) obtaining sensor data from the at least one sensor device, camera and/or microphone, and
  b) changing at least one process variable, process scheme and/or process parameter for controlling the biological treatment process at least partly based on said sensor data obtained by the at least one sensor device, camera and/or microphone.

In different embodiments, the technology disclosed relates to a method in a biological treatment system for biologically breaking down fat, oil and/or grease by adding a culture of microorganisms, said method comprising the steps of:
  a) receiving control or instruction data from at least one of another remotely located system or control unit, and
  b) changing at least one process variable, process scheme and/or process parameter for controlling the biological treatment process at least partly based on the received control or instruction data.

In embodiments, the control or instruction data is received from at least one of other remotely located system for biologically breaking down fat, oil and/or grease by adding a culture of microorganisms.

In embodiments, the control or instruction data is received from a remotely located master control unit for controlling a plurality of biological treatment systems.

In different embodiments, the technology disclosed relates to a method in a biological treatment system for biologically breaking down fat, oil and/or grease by adding a culture of microorganisms comprising at least one sensor device, camera and/or microphone, said method comprising the steps of:
  a) obtaining sensor data from the at least one sensor device, camera and/or microphone, and
  b) determining that a culture of microorganisms is performing well and that a sample containing the culture of microorganisms may or should be collected from the biological treatment zone or surface area of a biological treatment zone or surface area of the biological treatment system, wherein said determining is at least partly based on said sensor data obtained by the at least one sensor device, camera and/or microphone.

In different embodiments, the above method further comprises the step of sending data and/or providing information to a remotely located master control unit that a sample containing the culture of microorganisms may or should be collected from the biological treatment zone or surface area of the biological treatment zone or surface area of the biological treatment system.

In different embodiments, the technology disclosed relates to a method in a biological treatment system for biologically breaking down fat, oil and/or grease by adding a culture of microorganisms, said method comprising the steps of:
  a) receiving control or instruction data from at least one remotely located system or control unit, and
  b) determining that a sample containing a culture of microorganisms should be collected from the biological treatment zone or surface area of a biological treatment zone or surface area of the biological treatment system, wherein said step of determining that a sample should be collected is at least partly based on said control or instruction data received from said at least one remotely located system or control unit.

In certain embodiments of the above method, the control or instruction data is received from at least one other remotely located system for biologically breaking down fat, oil and/or grease by adding a culture of microorganisms. In other embodiments of the above method, control or instruction data is received from a remotely located master control unit for controlling a plurality of biological treatment systems.

In different embodiments, the technology disclosed relates to a system comprising a master control unit for controlling a plurality of remotely located systems for biologically treating fat, oil and/or grease by adding a culture of microorganisms for breaking down the fat, oil and/or grease, said master control unit is configured to receive data and/or provided information from said plurality of systems, wherein said data and/or provided information is at least partly based on sensor data obtained by at least one of a sensor device, camera and/or microphone of the respective system for biologically treating fat, oil and/or grease. In certain embodiments, the master control unit is configured to determine to change at least one process variable, process scheme and/or process parameter for controlling a biological treatment process at least partly based on said data and/or provided information received from a system for biologically treating fat, oil and/or grease.

In certain embodiments, the master control unit is configured to send control data or instruction data to change at least one process variable, process scheme and/or process parameter for controlling a biological treatment process of a second biological treatment system is at least partly based on data and/or provided information received from a first biological treatment system, and wherein said data and/or provided information is in turn at least partly based on sensor data obtained by a sensor device, camera and/or microphone of the first biological treatment system.

In embodiments, the above master control unit is configured to determine that a sample containing a culture of microorganisms in a biological treatment zone or surface area of a biological treatment system communicatively coupled to the master control unit should be collected from the biological treatment zone or surface area of the biological treatment zone or surface area of the biological treatment system, wherein said determining is at least partly based on data and/or information received from said biological treatment system, and wherein said data and/or information is at least partly based on sensor data obtained by a sensor device, camera and/or microphone of the biological treatment system.

In embodiments, the master control unit is comprising at least one processor configured for processing said data and/or information received from said biological treatment system, and wherein said data and/or information is at least partly based on sensor data obtained by a sensor device, camera and/or microphone of said biological treatment system. In certain embodiments, the at least one processor is configured to use at least one of soft sensor data, historic data, machine learning algorithms, deep learning algorithms and artificial intelligence for processing said data and/or information received from said biological treatment system.

In different embodiments, the technology disclosed relates to a master control unit configured to determine that a sample containing a culture of microorganisms in a biological treatment zone or surface area of a biological treatment system communicatively coupled to the master control unit should be collected from the biological treatment zone or surface area of the biological treatment zone or surface area of the biological treatment system, wherein said determining is at least partly based on data and/or information received from said biological treatment system, and wherein said data and/or information is at least partly based on sensor data obtained by a sensor device, camera and/or microphone of said biological treatment system. In embodiments, the master control unit is comprising at least one processor configured for processing said data and/or information received from said biological treatment system, and wherein said determining that a sample containing a culture of microorganisms, e.g. a spontaneous mutation of the culture of microorganisms initially added, should be collected is at least partly based on said processing of said received data and/or information. In certain embodiments, the at least one processor is configured to use at least one of soft sensor data, historic data, machine learning algorithms, deep learning algorithms and artificial intelligence for processing said data and/or information received from said biological treatment system to determine that a sample should be collected.

In embodiments, the technology disclosed relates to methods, a system and at least one system/tank for wastewater treatment using a combination of separation of fat, oil and grease (FOG) and biological treatment for reducing the amounts of FOG in wastewater with the aid of a liquid culture of microorganisms. In certain embodiments, the microbe culture, e.g. a liquid microbe culture, is added and distributed by air injection of an oxygen-containing gas such as air into a biological treatment zone of a container tank. Process variables or parameters for controlling the amounts of injected air per unit of time may be changed to thereby be adapted for increasing the concentration of microorganisms for enhanced, or improved, biological activity and breaking down of FOG in the wastewater treatment tank. Process variables or parameters for controlling the amounts of microorganisms injected/distributed into the wastewater tank, e.g. the biological treatment zone of the tank, may be changed to thereby increase or decrease the concentration of microorganisms in the tank/zone for enhanced, or improved, biological activity and breaking down of FOG in the wastewater treatment tank.

In these embodiments, the equipment of the technology disclosed makes it possible to use the container tank of the wastewater treatment tank simultaneously and concurrently as a separator and bioreactor. The separator function is a gravimetric separation process where FOG is collected in the usual way in the, for separated FOG intended, volume in the container. The bioreactor function provides for the FOG to be biologically broken down wholly or partly. To start the breaking down of FOG, a liquid culture of suitable microorganisms is added to a biological treatment zone of the container tank. In example embodiments, the culture of microorganisms includes at least one of living bacteria and fungi.

In embodiments, the container tank of the wastewater treatment system may comprise a distribution system for adding a microbe culture of microorganisms to the wastewater for biologically breaking down FOG in the wastewater. In certain embodiments, the microbe culture of microorganisms is added to the wastewater in a biological treatment zone of the container tank.

In the technology disclosed, the bio-culture is mixed efficiently with the content in the container by air injection improving the oxygenation conditions in the biological treatment zone. In example embodiments, the bio-culture may be mixed by air injection in a layer, or zone, that lays under a floating FOG layer in the FOG separator/bio-reactor. In other example embodiments, the bio-culture may be mixed by air injection in an intermediate layer that lays over a sludge layer and under a floating FOG layer in the FOG separator/bio-reactor. To maintain the biological process and intensify the break down and mixing, air is blown in using a system for injecting and distributing the air. The addition of a liquid starter culture containing a suitable mixture of living microorganisms, which are evenly distributed in the bioreactor with the aid of the air injection.

Thus, the bioreactor function is aimed at further reducing the concentration of FOG in the wastewater and is performed by the addition of a liquid culture of microorganisms. In example embodiments, the culture of microorganisms includes at least one of living bacteria and fungi. The growth of the microorganisms is increased by injecting air into the biological treatment zone for improved oxygenation and mixing of the wastewater. In certain embodiments, the methods of the technology disclosed is adapted to increase the efficiency of the combined FOG separator and bioreactor process.

In embodiments, the biological treatment zone is an aerobic treatment zone, maintained at aerobic conditions to promote the growth and/or metabolic activity of microorganisms, e.g. aerobic bacteria. The term "aerobic conditions" is used herein to refer, in general, to the presence of oxygen. The microorganisms, or aerobic bacteria, may, for example, facilitate and/or enhance the efficiency of a nitrifying bioprocess in which ammonia is oxidized to form nitrite which is in turn converted to nitrate. The aerobic bacteria may also, for example, facilitate and/or enhance the efficiency of a phosphorous uptake bioprocess in which soluble phosphorous is restored to the microorganisms, or aerobic bacteria.

The technology disclosed describes a process and wastewater treatment equipment for separating separable fat, oil and grease (FOG) from wastewater and reducing the amount of separable FOG which needs to be taken care of, i.e. be removed from a tank containing wastewater. In the process, a specially equipped container tank may be used. In embodiments, the technology disclosed further introduces a new design for the outlet pipe construction of the container for facilitating or enabling the container to simultaneously function as both a FOG separator and a bioreactor.

The addition of a culture of microorganisms according to the technology disclosed is used in a biological process, or bioprocess, for breaking down fat, oil and grease. In the technology disclosed, the microbe culture, e.g. a liquid microbe culture, is preferably added and distributed by injection of an oxygen-containing gas such as air into a biological treatment zone of a container for improved oxygenation. In various embodiments, the biological treatment zone may cover essentially the entire inner volume of the container or it may be a separate section or compartment of the container.

In embodiments, the methods of the technology disclosed may comprise operating the container tank of a wastewater treatment tank so that the accumulation of FOG, and the FOG thickness increase in the layer of FOG in the biological treatment zone, is decreased in that the injection of air per time unit is adapted to provide an increase in the biological activity, e.g. to keep the breaking down of FOG above a certain level during periods when high amounts of wastewater per unit of time is added to the tank, thereby providing for the biological process efficiency and breaking down of FOG faster reaching higher levels during periods when no wastewater, or a small inflow of wastewater, is added, i.e. faster reaction rates is achieved. The injection rates may then be adapted to avoid an injection of air at a level above which too much additional turbulence in the wastewater is produced which leads to an undesirable level of decrease in the gravimetric FOG separation efficiency which, in turn, causes an increase in the concentration of FOG flowing out through an outlet pipe portion of the container tank. The injection of air may be adapted to provide a concentration of FOG, e.g. defined in milligrams of hydrocarbons per liter of wastewater, flowing out through an outlet pipe portion of the biological treatment zone of the container tank which is below a certain threshold concentration, e.g. during periods when high amounts of wastewater per unit of time is added to the biological treatment zone. The threshold may then be at least one of the concentration of FOG, or milligrams of hydrocarbons per liter of wastewater, flowing out through an outlet pipe portion at a certain time instant and the average concentration of FOG, or milligrams of hydrocarbons per liter of wastewater, over a certain time period.

In embodiments of the technology disclosed related to wastewater treatment, at least one microphone or probe may be used for determining, detecting and/or measuring the thickness of the fat/FOG cake or sludge in a wastewater treatment tank, detecting and/or measuring the amounts of foam, and optionally the characteristics of the foam, formed on the fat/FOG cake and/or for detecting, measuring or determining audio characteristics in the wastewater treatment tank. A data processing unit may further be used for processing the data obtained by the at least one microphone or probe. Data or information, e.g. processed data, which is at least partly based on the measured/detected thickness of the fat/FOG cake or sludge and/or the obtained audio data, or audio characteristics, may then be sent from a control system/unit of a first wastewater treatment system to at least one of a remotely located master control unit of a system comprising a plurality of wastewater treatment systems and a control system of a second wastewater treatment.

In different embodiments of the technology disclosed, the analysis of the audio data may be done by a control system such as a controller in a control cabinet of the biological treatment system, e.g. wastewater treatment system, alternatively sensor data at least partly based on obtained audio data may be sent to a remotely located master control unit and/or up to the cloud where it is analyzed. Initially, an operator may, if necessary, analyze the audio data.

In embodiments, the master control unit may be configured to determine, at least partly based on the audio data obtained by the microphone or probe of a first wastewater treatment system and data or information received from the first wastewater treatment system, that a process variable/parameter of a second wastewater treatment system should be changed. The master control unit may be further configured send control/instruction data to the second wastewater treatment system for changing a process variable/parameter of the second wastewater treatment system at least partly based on audio data obtained by the microphone or probe of the first wastewater treatment system.

In embodiments, the control system of a second wastewater treatment system may be configured to determine, at least partly based on the audio data obtained by the microphone or probe of a first wastewater treatment system and data or information received from the first wastewater treatment system, that a process variable/parameter of a second wastewater treatment system should be changed.

In embodiments, three positions for the microphone may be considered: At the bottom of the tank under the sludge, in the tank enclosed by water and/or in the upper part of the tank surrounded by air. In certain embodiments, it may be sufficient to use a microphone or probe which is positioned measure one to measure all levels needed. As mentioned above, one of the most important benefits of introducing a microphone for determining/measuring/detecting sound characteristics in a wastewater tank include measuring the thickness of the fat/FOG cake. For example, the sound of air bubbles is audibly affected by the thickness of the fat/FOG cake. The amount of air in the tank may also affect echoes, which should result in the determination of volume of air and the resultant level of liquid and fat. In various embodiments, a sound impulse generated by a sound source of the wastewater system may be used in combination with at least one microphone, and optionally data processing, to determine/measure the thickness of the fat/FOG cake and/or to detect noise such as noise from pumps of the wastewater treatment tank. In embodiments, the at least one microphone may be located in the vicinity of the pumps of the wastewater treatment tank or in control cabinets of the wastewater treatment tank.

In embodiments of the technology disclosed related to wastewater treatment, at least one camera may be used for at least one of determining the thickness of the fat/FOG cake or sludge in a wastewater treatment tank, detecting and/or measuring the amounts of foam, and optionally the characteristics of foam, formed on the fat/FOG cake, and/or for determining/detecting characteristics of the wastewater in the wastewater treatment tank, e.g. for detecting the optical characteristics and/or visibility conditions in the wastewater. An image processing unit may then be used for processing the image data obtained by the at least one camera.

In embodiments, the control system of the wastewater system, or a master control unit, may be configured to determine, at least partly based on the image data obtained by the at least one camera and data or information received from the camera and control system, respectively, that a process variable/parameter of the second wastewater treatment system should be changed. In embodiments, the master control unit may be configured send control/instruction data to the wastewater treatment system for changing at least one process variable/parameter of the wastewater treatment system at least partly based on image data obtained by the at least one camera. In embodiments, the control system may be configured to send control/instruction data for changing at least one process variable/parameter of the wastewater treatment system at least partly based on image data obtained by the at least one camera. In embodiments, the master control unit may be configured send control/instruction data, to the wastewater treatment system, indicating that it is time to collect a liquid sample of microbe cultures of microorganisms from a wastewater tank of the wastewater treatment system at least partly based on image data obtained by the at least one camera. In embodiments, the control system of the wastewater system may be configured to generate and/or send a message such as a push message and/or control/instruction data for alerting an operator (e.g. via an application program of the mobile communication device of the operator) that a liquid sample of microbe cultures of microorganisms should be collected from the wastewater tank at least partly based on image data obtained by the at least one camera of the wastewater treatment system. In embodiments, the control system of the wastewater system may be configured to present display data on a display indicating that it is time to collect a liquid sample of microbe cultures of microorganisms from the wastewater tank of the wastewater treatment system in response to image data obtained by the at least one camera of the wastewater treatment system is indicating that it is time to collect a liquid sample of microbe cultures of microorganisms from the wastewater tank.

In embodiments, the master control unit may be configured to determine, at least partly based on the image data obtained by the at least one camera of the first wastewater treatment system and data or information received from the first wastewater treatment system, that a process variable/parameter of the second wastewater treatment system should be changed. The master control unit may be further configured send control/instruction data to the second wastewater treatment system for changing at least one process variable/parameter of the second wastewater treatment system at least partly based on image data obtained by the at least one camera of the first wastewater treatment system.

In embodiments, the control system of a second wastewater treatment system may be configured to determine, at least partly based on the image data obtained by the at least one camera of the first wastewater treatment system and data or information received from the first wastewater treatment system, that at least one process variable/parameter of the second wastewater treatment system should be changed, e.g. process variables/parameters for controlling the injected amount of air per time unit and/or process variables/parameters for controlling the amount of microorganisms dosed/distributed/injected into the container tank/biological treatment zone of the second wastewater treatment system.

In certain embodiments, the at least one waste treatment system or wastewater treatment system according to the technology disclosed may be configured with at least one gas detector for detecting odor, odor components and/or corrosion, e.g. a hydrogen sulphide gas detector. Sensor data which is at least partly based on the measured/detected amounts of odor, e.g. a measured concentration of odor components such as hydrogen sulphide in the wastewater, may be used for controlling the biological treatment process for breaking down FOG in a system for treatment of waste, wastewater and/or accumulated FOG in the same system or in a different system from the system the odor detector is located. In a waste treatment system, or a wastewater treatment system, the odor detector may be used under the control of a pH detector, or in combination with a pH detector to compile sensor data to determine the amounts of odor. In different embodiments, the compiled sensor data is sent to the control system of the treatment system and/or to a remotely located master control unit for analysis. The control system of the treatment system and/or the master control unit may then be configured to send control/instruction data, at least partly based on the received sensor data (which in turn is at least partly based on a measured/detected concentration of odor components or odor gas) for changing a biological treatment process in the same treatment system or changing the process in another treatment system for breaking down FOG.

In embodiments, the at least one waste treatment system or wastewater treatment system according to the technology disclosed may comprise at least one oxygen detector for detecting the concentration of oxygen. The at least one oxygen detector may be configured to detect or measure the concentration of oxygen in the wastewater. In a wastewater system, the oxygen detector may be located in the wastewater treatment tank enclosed by wastewater under treatment or at or close to the inflow to the wastewater treatment tank.

In embodiments, the sensor data in the form of the measured/detected concentration of oxygen in the wastewater may be used for controlling the biological treatment process for breaking down FOG in a system for treatment of waste, wastewater and/or accumulated FOG in the same system or in a different system from the system the oxygen detector is located. In a waste treatment system or a wastewater treatment system, the oxygen detector may be used under the control of a pH detector, or in combination with a pH detector to compile sensor data to determine the amount of odor, where the compiled sensor data is sent to the control system of the treatment system and/or to a remotely located master control unit for analysis.

In embodiments, the control system of the treatment system and/or the master control unit may then be configured to send control/instruction data, at least partly based on the received sensor data (which in turn is at least partly based on a measured/detected concentration of oxygen) for changing a biological treatment process in the same treatment system or changing a biological treatment process in another treatment system for breaking down FOG.

In embodiments, the wastewater treatment system according to the technology disclosed may comprise at least one sensor for measuring/detecting temperature, e.g. for measuring the temperature of wastewater in the tank. A measured temperature, or change in temperature, by the at least one temperature may trigger the control system of the wastewater treatment system, or a remotely located master control unit, to initiate a change in product type, e.g. change and/or add a new culture/composition of microorganisms in the biological treatment zone of the wastewater treatment system for biologically breaking down FOG. The new culture/composition of microorganisms dosed/added to the biological treatment zone may be known by the control system and/or master control unit to provide improved bacterial growth at the measured temperature compared to the currently used culture/composition of microorganisms. In different embodiments, at least one of the at least one sensor for measuring/detecting temperature may be an infrared camera or detector for detecting heat changes in the wastewater treatment system.

In embodiments, other actions that may be triggered and/or performed in response to a certain temperature or temperature change measured by the at least one sensor for measuring/detecting temperature, and that may be instructed by sending control/instruction data, sending a push message and/or data for providing information on a display, e.g. on a stationary or mobile communication device, include adjusting the time for the biological treatment process or actively adjusting the wastewater temperature to create improved or optimal conditions for bacterial growth and/or biologically breaking down FOG.

In embodiments, the control system of the wastewater treatment system and/or the master control unit, may be configured to receive data or information at least partly based on sensor data measured by the temperature sensor and at least partly based on this sensor data, send control/instruction data to initiate a change of culture/composition of microorganisms used for biologically breaking down FOG. In embodiments, the control system of the wastewater system may be configured to control the presentation of information on a display indicating that it is time to collect a liquid sample of microbe cultures of microorganisms from the wastewater tank of the wastewater treatment system in response to measured data obtained by the at least one temperature sensor of the wastewater treatment system is indicating that it is time to collect a liquid sample of microbe cultures of microorganisms from the wastewater tank. The data or information received by at least one of the control system and a master control unit, and which is based at least partly on the measurements by the at least one temperature sensor, may also be used for determining that a certain culture/composition of microorganisms is performing well at a certain temperature and that a sample of certain culture/composition of microorganisms can or should be collected and reused in another biological treatment process for biologically breaking down wastewater, but may also be used in another biological treatment process for biologically breaking down waste and/or polluted air. The collected liquid sample may then be a spontaneous mutation of the microbe culture of microorganisms initially used for the treatment process. The indication that a certain culture/composition of microorganisms can, or should, be collected and reused in another biological treatment process may be combined with information, a message and/or instructions data for controlling process variables/parameters of the new treatment process for biologically breaking down waste, wastewater and/or polluted air so that it is performed at the measured temperature.

In embodiments, the biological treatment systems for breaking down FOG in a waste treatment tank, or wastewater treatment tank according to the technology disclosed may comprise at least one sensor for measuring the air temperature, e.g. located close to wastewater treatment tank, or close to a tank for treating waste. A measured air temperature, or change in air temperature, by the at least one sensor may trigger the control system of the biological treatment system, or a remotely located master control unit, to initiate a change in product type, e.g. change and/or add a new culture/composition of microorganisms used for biologically breaking down FOG in a biological treatment zone/area of waste treatment tank, or a wastewater treatment tank. The new culture/composition of microorganisms dosed/added to the biological treatment zone of the system may be known by the control system and/or master control unit to provide improved bacterial growth at the measured air temperature compared to the currently used culture/composition of microorganisms used in the system for biologically breaking down FOG. In different embodiments, at least one of the at least one sensor for measuring/detecting air temperature may be an infrared camera or detector for detecting heat changes in a waste treatment tank or wastewater treatment tank.

In different embodiments of the technology disclosed, the analysis of audio data obtained by the at least one microphone or probe may be done by a control system, such as a controller in a control cabinet, of the biological treatment system, e.g. a waste treatment system, or a wastewater treatment system. Alternatively, sensor data which at least partly based on obtained audio data or image data is sent to a remotely located master control unit and/or up to the cloud where it is analyzed. Initially, an operator may, if necessary, analyze the audio data and, optionally, provide his/her input to which sensor data, which is at least partly based on the obtained audio data, is sent to the remotely located master control unit and/or up to the cloud.

In certain embodiments of the technology disclosed, at least one pressure sensor may be used for measuring air pressure in a wastewater treatment system. The at least one pressure sensor may be connected to pipes for detecting leaks in ducts/tubes/pipes and/or faults in a pump of the wastewater treatment system. The at least one pressure sensor may then be located/positioned and configured to detect sudden changes in pressure in the system which may be an indicator of leaks in ducts/tubes/pipes and/or faults in a pump of the wastewater treatment. Sensor data may be at least partly based on the detected pressure drop/change and/or an operator may be alerted when abnormal pressure is detected.

The technology disclosed relates to a system for biologically treating fat, oil and/or grease by adding a culture of microorganisms for breaking down the fat, oil and/or grease comprising a control system or unit and at least one sensor, camera and/or microphone for obtaining at least one of sensor data, image data and audio data related to the process for breaking down the fat, oil and/or grease, wherein the system is configured to at least one of change at least one process variable and/or parameter related to the biological treatment process and determine that a sample containing a culture of microorganisms should be collected, and wherein the action by the system to change at least one process variable and/or parameter and/or determining that a sample should be collected is at least partly based on the at least one of sensor data, image data and audio data obtained by the at least one sensor device, camera and/or microphone. In different embodiments, the system may be a wastewater treatment system, a waste management system, a fraction collector, a fraction separator, or a treatment plant.

In embodiments, the control system or unit of the system for biologically treating fat, oil and/or grease may be configured to receive or collect the at least one of sensor data, image data and audio data from the at least one sensor device, camera and/or microphone. The control system or unit may further be configured to determine that a sample containing a culture of microorganisms should be collected at least partly based on the at least one of sensor data, image data and audio data obtained by the at least one sensor device, camera and/or microphone.

In embodiments, the control system or unit of the system for biologically treating fat, oil and/or grease may be configured to send data or information at least partly based on the obtained at least one of sensor data, image data and audio data. The control system or unit may further be configured to send the data or information to at least one of another system for biologically treating fat, oil and/or grease by adding a culture of microorganisms and a remotely located master control unit for controlling a plurality of systems for biologically treating fat, oil and/or grease.

In embodiments the control system or unit of the system for biologically treating fat, oil and/or grease may be configured to receive control or instruction data from at least one of another system for biologically treating fat, oil and/or grease and a remotely located master control unit for controlling a plurality of systems for biologically treating fat, oil and/or grease. The control system or unit may be further configured to determine that a sample containing a culture of microorganisms, e.g. a spontaneous mutation of the culture of microorganisms initially added to the treatment process, should be collected at least partly based on the control or instruction data received from the at least one of another system for biologically treating fat, oil and/or grease and a remotely located master control unit.

In embodiments, the control system or unit of the system may be configured to receive control or instruction data from the control system or unit of at least one of another remotely located system for biologically treating fat, oil and/or grease and a remotely located master control unit for controlling a plurality of systems for biologically treating fat, oil and/or grease. The control system or unit may be further configured to change at least one process variable and/or parameter at least partly based on the control or instruction data received from the at least one of another system for biologically treating fat, oil and/or grease and/or the remotely located master control unit.

In embodiments, the system for biologically treating fat, oil and/or grease may be communicatively coupled to a master control unit remotely located from at least one of a plurality of systems for biologically treating fat, oil and/or grease including a first and a second system. The master control unit may be configured to receive, from at least one of the plurality of systems, data such as sensor data related to a treatment or separation process for at least one of said plurality of systems. The plurality of systems may include at least one of a plurality of wastewater treatment systems, and a plurality of waste management systems.

In embodiments, the system for biologically treating fat, oil and/or grease may be communicatively coupled to another remotely located system for biologically treating fat, oil and/or grease by adding a culture of microorganisms for breaking down the fat, oil and/or grease. The control system or unit may be configured to receive at least one of sensor data and control data from the remotely located system. The control system or unit may be further configured to at least one of change at least one process variable and/or parameter related to the biological treatment process and determine that a sample containing a culture of microorganisms, e.g. a spontaneous mutation of the culture of microorganisms initially added to the treatment process, should be collected at least partly based on the at least one of sensor data and control data received from the remotely located system for biologically treating fat, oil and/or grease.

In embodiments, the technology disclosed relates to a system comprising a master control unit remotely located from at least one of a plurality of sub-systems including a first and a second sub-system. The master control unit is configured to receive, from at least one of the plurality of sub-systems, data related to a treatment or separation process for at least one of the plurality of sub-systems. The plurality of sub-systems may include a plurality of wastewater treatment systems.

In embodiments, the technology disclosed relates to a system comprising a master control unit remotely located from at least one of a plurality of sub-systems including a first and a second sub-system. The master control unit may be configured to receive, from at least one of the plurality of sub-systems, data related to a treatment or separation process for at least one of the plurality of sub-systems. The plurality of sub-systems may include a plurality of wastewater treatment systems. The system may then also comprise a plurality of wastewater treatment systems including a first and a second wastewater treatment system and the master control unit may be configured to receive, from at least one of the plurality of wastewater treatment systems, data or information related to the wastewater treatment process for at least one of the plurality of wastewater treatment systems.

In embodiments, the technology disclosed relates to a system comprising a master control unit remotely located from at least one of a plurality of sub-systems including a first and a second sub-system. The master control unit may be configured to receive, from at least one of the plurality of sub-systems, data related to a treatment or separation process for at least one of said plurality of sub-systems. The plurality of sub-systems may include a plurality of wastewater treatment systems. The system may then comprise a plurality of wastewater treatment systems including a first and a second wastewater treatment system and the master control unit may be configured to receive, from at least one of the plurality of wastewater treatment systems, data or information related to the biological treatment process for at least one of the plurality of wastewater treatment systems. The data may indicate that it is time to collect an air sample containing microorganisms from the first wastewater treatment system and the system may be configured to add the collected liquid sample containing microorganisms to the second wastewater treatment system.

In embodiments, the technology disclosed relates to a system comprising a master control unit remotely located from at least one of a plurality of sub-systems including a first and a second sub-system. The master control unit is configured to receive, from at least one of the plurality of sub-systems, data related to a treatment or separation process for at least one of the plurality of sub-systems. The plurality of sub-systems may include a plurality of wastewater treatment systems. The master control unit may then be configured to determine, based on data or information received from at least a first sub-system among the plurality of sub-systems, that it is time to extract or collect a liquid sample from the process of said first sub-system.

In embodiments, the technology disclosed relates to a system comprising a master control unit remotely located from at least one of a plurality of sub-systems including a first and a second sub-system. The master control unit is configured to receive, from at least one of the plurality of sub-systems, data related to a treatment or separation process for at least one of the plurality of sub-systems. The plurality of sub-systems may include a plurality of wastewater treatment systems. The data or information may be received from a first wastewater treatment system among a plurality of wastewater treatment systems and may provide the master control unit with information indicating that it is time to collect a liquid sample of microbe cultures of microorganisms from the first wastewater treatment system.

In embodiments, the technology disclosed relates to a system comprising a master control unit remotely located from at least one of a plurality of sub-systems including a first and a second sub-system. The master control unit is configured to receive, from at least one of the plurality of sub-systems, data related to a treatment or separation process for at least one of the plurality of sub-systems. The plurality of sub-systems may include a plurality of wastewater treatment systems. The received data on which the determining of whether it is time to collect a liquid sample of microbe cultures of microorganisms may be based on at least one of at least one parameter associated with process variables and data related to the biological behavior of at least one microbe culture of microorganisms used for biologically breaking down wastewater.

In embodiments, the technology disclosed relates to a system comprising a master control unit remotely located from at least one of a plurality of sub-systems including a first and a second sub-system. The master control unit is configured to receive, from at least one of the plurality of sub-systems, data related to a treatment or separation process for at least one of the plurality of sub-systems. The plurality of sub-systems may include a plurality of wastewater treatment systems. The received data on which the decision by the master control unit whether it is time to extract a liquid sample of microbe cultures of microorganisms may be related to or based on at least one of measured sensor data and soft sensor data received from at least one of the plurality of wastewater treatment systems.

In embodiments, the technology disclosed relates to a method in a system comprising a plurality of sub-systems for biologically treating wastewater, the method comprising the steps of:
  a. collecting and/or identifying at least one of sensor data, image data and process variables related to a treatment process of a first sub-system, and
  b. receiving, at a second sub-system, data and/or information related to at least one of the collected and/or identifying at least one of sensor data, image data and process variables related to the treatment process of the first sub-system communicatively coupled to the control unit of the second subs-system.

In embodiments, the technology disclosed relates to a method in a system comprising a plurality of sub-systems for biologically treating wastewater, the method comprising the steps of:
  a. collecting and/or identifying at least one of sensor data, image data and process variables related to a treatment process of a first sub-system,
  b. receiving, at a second sub-system, data and/or information related to at least one of the collected and/or identifying at least one of sensor data, image data and process variables related to the treatment process of the first sub-system communicatively coupled to the control unit of the second subs-system, and
  c. identifying, by the control unit of the second sub-system and at least partly based on the received at least one of sensor data, image data and process variables, that a process variable for a treatment process of the second sub-system should be changed.

In embodiments, the technology disclosed relates to a method in a system comprising a plurality of sub-systems for at least one of handling wastewater, the method comprising the steps of:
  a. collecting and/or identifying at least one of sensor data, image data and process variables related to a treatment process of a first sub-system,
  b. receiving, at a second sub-system, data and/or information related to at least one of the collected and/or identifying at least one of sensor data, image data and process variables related to the treatment process of the first sub-system communicatively coupled to the control unit of the second subs-system, and
  c. identifying, by the control unit of the second sub-system and at least partly based on the received at least one of sensor data, image data and process variables, that a sample comprising a composition/culture of microorganisms should be collected from a treatment process of the first sub-system and added to treatment process of the second sub-system.

In embodiments, the technology disclosed relates to a method in a system comprising a plurality of sub-systems for handling wastewater, the method comprising the steps of:
  a. receiving, at a second sub-system, at least one of sensor data, image data and process variables related to a treatment process of a first sub-system communicatively coupled to the control unit of the second subssystem, and
  b. identifying, by control unit of the second sub-system and at least partly based on the received at least one of sensor data, image data and process variables, that a sample comprising a composition/culture of microorganisms should be collected from a treatment process of the first sub-system and added to treatment process of the second sub-system.

In embodiments, the technology disclosed relates to a method in a system comprising a master control unit and a plurality of sub-systems, the method comprising the steps of:
  a. receiving, at a master control unit, at least one of sensor data, image data and process variables related to a treatment process of a first sub-system communicatively coupled to the master control unit, and
  b. identifying, at the master control unit and at least partly based on the received at least one of sensor data, image data and process variables, that a sample comprising a composition/culture of microorganisms should be collected from a treatment process of the first sub-system.

In embodiments, at least one of the sub-systems in any of the above methods include at least one of a fraction collector, or fraction separator, a waste management system and a treatment plant.

In embodiments, the above method may further comprise the steps of collecting a sample of a composition/culture of microorganisms from the first sub-system and adding the collected sample with the composition/culture of microorganisms to a treatment process of a second sub-system remotely located from the first sub-system. Advantages of this method include that a spontaneous mutation of a composition/culture of microorganisms initially added to a first treatment process of a sub-system, e.g. a first wastewater treatment process of a first wastewater treatment system, and is indicated by received sensor data, image data and/or process variables to improve the treatment process, may be collected or extracted from the first biological treatment process and added to a second biological treatment process of a second treatment system, e.g. a second wastewater treatment system remotely located from the first treatment system. In certain embodiments, said step of identifying comprises performing calculations based on said received at least one of sensor data, image data and process variables to determine whether a sample comprising a composition of microorganisms should be collected from the first biological treatment process of the first sub-system.

In different embodiments, the technology disclosed relates to a method in a system comprising a master control unit and a plurality of wastewater treatment systems, the method comprising the steps of:

a. receiving, at a master control unit, at least one of sensor data, image data and process variables related to a wastewater treatment process of a first wastewater treatment system communicatively coupled to the master control unit, b. determining or identifying, at the master control unit and at least partly based on the received at least one of sensor data, image data and process variables, that a sample comprising a composition of microorganisms should be collected from a wastewater treatment process of the first wastewater treatment system.

In certain embodiments, the above method may further comprise the steps of collecting a sample containing a composition of microorganisms from a first wastewater treatment process for biologically breaking down wastewater of a first wastewater treatment system and adding the collected sample with the composition of microorganisms to a wastewater treatment process for breaking down wastewater of a second wastewater treatment system remotely located from the first wastewater treatment system. In embodiments, the above method may further comprise the steps of collecting a sample of a composition of microorganisms from the first wastewater treatment system and adding the collected sample with the composition of microorganisms to a treatment process of a second wastewater treatment system remotely located from the first wastewater treatment system. Advantages of this method include that a spontaneous mutation of a composition/culture of microorganisms initially added to a first of a wastewater treatment system is indicated by received sensor data, image data and/or process variables to improve the wastewater treatment process, may be collected or extracted from the first biological treatment process and added to a second biological treatment process of a second wastewater treatment system, e.g. a second wastewater treatment system remotely located from the first wastewater treatment system. In certain embodiments, said step of identifying comprises performing calculations based on said received at least one of sensor data, image data and process variables to determine whether a sample comprising a composition of microorganisms should be collected from the first biological treatment process of the first wastewater treatment system.

In different embodiments, the technology disclosed relates to a method in a system comprising a master control unit and a plurality of waste management systems, the method comprising the steps of:

a. receiving, at a master control unit, at least one of sensor data, image data and process variables related to a waste management process of a first waste management system communicatively coupled to the master control unit, b. determining or identifying, at the master control unit and at least partly based on the received at least one of sensor data, image data and process variables, that a sample comprising a composition of microorganisms should be collected from a waste management process of the first waste management system.

In embodiments, the sample comprising the composition/culture of microorganisms which was collected from the first waste management system is used/reused in a second waste management system. The sample may be a liquid sample collected from the first waste management system and the liquid sample comprising the collected composition/culture of microorganisms is added to the second waste management process using nozzles to provide a waste container of the second waste management system with the liquid sample of microorganisms.

In embodiments, the waste management system comprises a waste processing tank and a spraying system configured with a container containing the composition/culture of microorganisms collected from another treatment system, and at least one nozzle for spraying the collected composition/culture of microorganisms into the waste processing tank.

In embodiments, the plurality of sub-systems of the system include at least one wastewater treatment system for biologically breaking down wastewater. Each of the plurality of wastewater treatment system for biologically breaking down wastewater may then comprise a control unit communicatively coupled to the control unit of another wastewater treatment system for biologically breaking down wastewater. The control unit typically comprises a processor for processing data and may also be configured to perform calculations. The control units of the wastewater treatment systems for biologically breaking down wastewater may then be configured to share data and/or information related their own treatment process with the control units of at least one other sub-system. In certain embodiments, the plurality of sub-systems of the system include a plurality of wastewater treatment systems for biologically breaking down wastewater. In certain embodiments, the sub-system comprising a control unit for sharing data and/or information about its own process and/or receiving data and/or information associated with the process of another sub-system include at least one of a fraction collector, a waste management system and a treatment plant. In embodiments, the plurality of sub-systems are communicatively coupled to and configured to at least one of receive and exchange data or information with at least one other device or system. In certain embodiments, the other device or system include at least one of a booking system, a weather report system and a dishwasher.

In embodiments, the fraction collector, or separator, may include a cyclone, a hydrocyclone, a centrifuge, a sedimentation tank, a sedimentation column, a filter, and the like. The fraction collector may further include a gravimetric separator with the ability to select for good settling solids by means of gravimetric selection in the gravimetric selector.

In embodiments, the control unit of a second sub-system is configured to determine, based on data or information received from a first sub-system among a plurality of sub-systems, that it is time to extract a sample from the process of the first sub-systems. In certain embodiments, the data or information is received from a first wastewater treatment system among a plurality of wastewater treatment systems and is indicating that it is time to extract or collect a liquid sample of microbe cultures of microorganisms from the first wastewater treatment system. The liquid sample of microbe cultures of microorganisms extracted or collected from the first wastewater treatment system may then be added to a second wastewater treatment system. In certain embodiments, the received data on which the determining of whether it is time to extract a liquid sample of microbe cultures of microorganisms from the first wastewater treatment system is based on at least one of process variables and data related to the biological behavior of at least one microbe culture of microorganisms used for biologically breaking down wastewater.

In embodiments, the received data on which the decision whether it is time to extract a liquid sample of microbe cultures of microorganisms is based on at least one of process variables for said wastewater treatment process and data related to the biological behavior of said microbe cultures of microorganisms to be extracted. The control unit typically comprises a processor for processing data and may also be configured to perform calculations. In embodiments, the decision by the control unit of either the first or the second wastewater treatment sub-system whether it is time to extract a liquid sample of microbe cultures of microorganisms is at least partly based on calculations performed by the control unit. In certain embodiments, the calculations are based on data received from the first wastewater treatment system, and the received data is at least one of process variables for the wastewater treatment process and data related to the biological behavior of the microbe cultures of microorganisms.

In embodiments, the received data on which the decision by the control unit of either the first or the second wastewater treatment sub-system whether it is time to extract a liquid sample of microbe cultures of microorganisms is based on at least one of measured or detected sensor data and soft sensor data received from at least one of the other wastewater treatment systems.

In embodiments, the received data on which the decision by the control unit of either the first or the second wastewater treatment sub-system whether it is time to extract a liquid sample of microbe cultures of microorganisms is based on at least one of measured sensor data and soft sensor data received from a plurality of other wastewater treatment systems among the plurality of wastewater treatment systems. In certain embodiments, the received data on which the decision by the master control unit whether it is time to extract a liquid sample of microbe cultures of microorganisms is at least partly based on sensor data indicating the biological behavior of the microbe culture of microorganisms to be extracted. In certain embodiments, the sensor data is sensor data measured by at least one sensor of the wastewater treatment system from which the microbe culture of microorganisms is to be extracted.

In embodiments, the control unit of a first wastewater treatment system is further configured to send control data for changing at least one process variable for the wastewater treatment process of the second wastewater treatment system, where the control data is at least partly based on data and/or information related to the wastewater treatment process of the first wastewater treatment system.

In embodiments, the control unit of a second wastewater treatment system is configured to receive, from a first wastewater treatment system and via a data communications network, sensor data related to the first wastewater treatment process. The control unit of the of a first wastewater treatment system may then be configured to send control data to the second wastewater treatment system for changing the wastewater treatment process for the second wastewater treatment system at least partly based on the sensor data collected by the first wastewater treatment system.

In embodiments, the data received by the control unit of the second wastewater treatment system include sensor data measured by a sensor associated with the first wastewater treatment process, where the control unit of the first wastewater treatment system is configured to send control data for changing process parameters for the second wastewater treatment system at least partly based on the received sensor data.

In embodiments, the first and second wastewater treatment system, each configured with a control unit for sharing measured sensor data, images or parameter values related to process variables with control units of other wastewater treatment systems, are both configured for biologically breaking down wastewater and are provided with mutually different compositions of microbe cultures of microorganisms. In certain embodiments, the data received by the other control units includes data related to the biological behavior of a first composition of microbe cultures of microorganisms of the first wastewater treatment process. In certain embodiments, the control unit of the first and/or the second wastewater treatment system is configured to identify that the first liquid sample of microbe cultures of microorganisms is suitable for the second wastewater treatment process based on the received data related to the biological behavior of the first liquid sample of microbe cultures of microorganisms.

In embodiments, the control unit of the second wastewater system is configured to receive, from the first wastewater treatment system, both process variables and sensor data related to the first wastewater treatment process. The control unit of at least one of the first and the second wastewater treatment system may then be configured to, at least partly based on the received process variables and sensor data, identifying that a current microbe culture of microorganisms of the first wastewater treatment process is suitable for the second wastewater treatment process and in addition determine how process variables of the second wastewater treatment process needs to be changed to at least one of improve the current wastewater treatment process and/or better adapt the wastewater treatment process of the second wastewater treatment system to use a liquid sample of microbe culture of microorganisms extracted from the first wastewater treatment process. In certain embodiments, the current microbe culture of microorganisms of the first wastewater treatment process is a different composition from the microbe culture of microorganisms initially used for the first wastewater treatment process. The current microbe culture of microorganisms of the first wastewater treatment process may then be a spontaneous mutation of the microbe culture of microorganisms initially used for and added to the first wastewater treatment process.

In embodiments, the control unit of the first wastewater treatment system is configured to send control data to the second wastewater treatment system for changing process variables of the second wastewater treatment process to thereby adapt the second wastewater treatment process to comprise a liquid sample of the current microbe culture of microorganisms extracted and received from the first wastewater treatment process of the first wastewater treatment system.

In embodiments, the system comprises a centralized unit is a master control unit includes a computer processor, where the master control unit is remotely located from at least one of a plurality of sub-systems including a first and a second sub-system. The master control unit may then be configured to receive, from at least one of the plurality of sub-systems, data related to a treatment or separation process for at least one of the plurality of sub-systems, and the plurality of sub-systems include a plurality of wastewater treatment systems. In embodiments, the plurality of sub-systems of the system include at least one wastewater treatment system for biologically breaking down wastewater. In certain embodiments, the plurality of sub-systems of the system include a plurality of wastewater treatment systems for biologically breaking down wastewater. In embodiments, the sub-systems of the system include at least one of a fraction collector, a waste management system and a treatment plant. In embodiments, the plurality of sub-systems are communicatively coupled to and configured to at least one of receive and exchange data or information with at least one other device or system, and where the other device or system include at least one of a booking system, a weather report system and a dishwasher.

In embodiments, the control unit of a second sub-system is configured to determine, based on data or information received from a first sub-system among a plurality of sub-systems, that it is time to extract a sample from the process of the first sub-systems. In certain embodiments, the data or information is received from a first wastewater treatment system among a plurality of wastewater treatment systems and is indicating that it is time to extract a liquid sample of microbe cultures of microorganisms from the first wastewater treatment system.

In embodiments, the received data on which the determining of whether it is time to extract a liquid sample of microbe cultures of microorganisms is based on at least one of process variables and data related to the biological behavior of at least one microbe culture of microorganisms used for biologically breaking down wastewater.

In embodiments, the received data on which the decision whether it is time to extract a liquid sample of microbe cultures of microorganisms is based on at least one of process variables for said wastewater treatment process and data related to the biological behavior of said microbe cultures of microorganisms to be extracted. In embodiments, the decision by the master control unit whether it is time to extract a liquid sample of microbe cultures of microorganisms is at least partly based on calculations performed by the master control unit. In certain embodiments, the calculations are based on data received from the first wastewater treatment system, and the received data is at least one of process variables for the wastewater treatment process and data related to the biological behavior of the microbe cultures of microorganisms.

In embodiments, the received data on which the decision by the master control unit whether it is time to extract a liquid sample of microbe cultures of microorganisms is based on at least one of measured sensor data and soft sensor data received from at least one of the plurality of wastewater treatment systems.

In embodiments, the received data on which the decision by the master control unit whether it is time to extract a liquid sample of microbe cultures of microorganisms is based on at least one of measured sensor data and soft sensor data received from a plurality of wastewater treatment systems among the plurality of wastewater treatment systems. In certain embodiments, the received data on which the decision by the master control unit whether it is time to extract a liquid sample of microbe cultures of microorganisms is at least partly based on sensor data indicating the biological behavior of the microbe culture of microorganisms to be extracted. In certain embodiments, the sensor data is sensor data measured by at least one sensor associated with the wastewater treatment system from which the microbe culture of microorganisms is to be extracted.

In embodiments, the master control unit is further configured to send control data for changing at least one process variable for the wastewater treatment process of the second wastewater treatment systems, and where the control data is at least partly based on data received from the first wastewater treatment system.

In embodiments, the master control unit is configured to receive, from the first wastewater treatment system and via a data communications network, sensor data related to the first wastewater treatment process. The master control unit may then be configured to send control data to the second wastewater treatment system for changing the wastewater treatment process for the second wastewater treatment system at least partly based on the sensor data received from the first wastewater treatment system.

In embodiments, the data received by the master control unit include sensor data measured or detected by a sensor associated with the first wastewater treatment process, and where the master control unit is configured to send control data for changing process parameters for the second wastewater treatment system at least partly based on the received sensor data.

In embodiments, the first and second wastewater treatment system communicatively coupled to the master control unit are both configured for biologically breaking down wastewater and are provided with mutually different compositions of microbe cultures of microorganisms. In certain embodiments, the data received by the master control unit includes data related to the biological behavior of a first composition of microbe cultures of microorganisms of the first wastewater treatment process.

In embodiments, the master control unit is configured to identify that the first liquid sample of microbe cultures of microorganisms is suitable for the second wastewater treatment process based on the received data related to the biological behavior of the first liquid sample of microbe cultures of microorganisms.

In embodiments, the master control unit is configured to receive, from the first wastewater treatment system, both process variables and sensor data related to the first wastewater treatment process. The master control unit may then be configured to, at least partly based on the received process variables and sensor data, identifying that a current microbe culture of microorganisms of the first wastewater treatment process is suitable for the second wastewater treatment process and in addition determine how process variables of the second wastewater treatment process needs to be changed to at least one of improve the current wastewater treatment process and/or better adapt the wastewater treatment process of the second wastewater treatment system to use a liquid sample of microbe culture of microorganisms extracted from the first wastewater treatment process. In certain embodiments, the current microbe culture of microorganisms of the first wastewater treatment process is a different composition from the microbe culture of microorganisms initially used for the first wastewater treatment process. The current microbe culture of microorganisms of the first wastewater treatment process may then be a spontaneous mutation of the microbe culture of microorganisms initially used for and added to the first wastewater treatment process.

In embodiments, the master control unit is configured to send control data to the second wastewater treatment system for changing process variables of the second wastewater treatment process to thereby adapt the second wastewater treatment process to comprise a liquid sample of the current microbe culture of microorganisms extracted and received from the first wastewater treatment process of the first wastewater treatment system.

In certain aspects, it is an object of the technology disclosed is to provide a method, a system and a wastewater tank for the treatment of wastewater containing a mixture of sanitary wastewater and FOG-rich wastewater by biologically pre-treating substances and/or constituents of sanitary wastewater in a first process step to improve the gravimetric FOG separation efficiency in a subsequent process step.

In embodiments, the sub-systems and/or the master control unit of the system and technology disclosed may be communicatively connected to other devices and systems which are not systems for treatment or handling wastewater. Examples of other devices and systems include, but is not limited to, booking systems, e.g. for a system for booking hotel rooms or table at a restaurant, weather report systems, dishwashers etc. The master control unit and the sub-system may be configured to send, receive and/or exchange data or information to or with these other devices to inform about a process or change a process variable of a treatment process. As an example, the decision by the control system of a treatment system or the master control unit whether to change a process variable or extract a sample from an ongoing treatment process may be at least partly based on data or information received from at least one other device.

According to embodiments, the system of the technology disclosed comprises a master control unit and a plurality of sub-systems, e.g. a wastewater treatment system. At least a plurality of the plurality of sub-systems may then comprise at least one of cameras and sensors for measuring certain parameters related to a process of the sub-system. In the broadest definition, a sensor is a device, module, or subsystem whose purpose is to detect events or changes in its environment and send the information to other electronics, frequently a computer processor. A sensor is typically used with other electronics.

In certain aspects, the technology disclosed relates to a method, a system and a wastewater tank for treatment of wastewater containing a mixture of sanitary wastewater containing relatively high concentrations of feces and cellulose and wastewater containing relatively high concentrations of fat, oil and grease (FOG). The technology disclosed may then relate to a method, a system and a wastewater tank for reducing the amounts of FOG in wastewater with the aid of a plurality of liquid cultures of microorganisms, where two of the cultures of microorganisms are selected to be suitable for the different purposes of biologically breaking down constituents of sanitary wastewater and FOG, respectively.

Specifically, the technology disclosed may relate to a method and multistage process which includes adding at least two separate cultures of microorganisms and biologically pre-treating wastewater to improve the gravimetric FOG separation efficiency in a subsequent process step, and a wastewater tank, or a system comprising a plurality of wastewater tanks, adapted for biologically pre-treating wastewater to thereby improve the conditions for a subsequent gravimetric FOG separation process aimed at reducing the amounts of FOG flowing out of the wastewater tank, or system of wastewater tanks.

According to embodiments of the technology disclosed, the plurality of sub-systems, e.g. a wastewater treatment system or fraction collector system, of the system may comprise at least one of cameras and sensors for measuring certain parameters related to a process such as a process in a fraction separator or a treatment process such as a wastewater treatment process, e.g. a sensor for measuring the thickness of the FOG/fat cake, a gas sensor for detecting odor in air or a sensor for measuring water thickness. In certain embodiments, the sensors used in the technology disclosed may be at least one of soft sensor, gas sensors, acoustic wave sensors, ultrasonic sensors, inductive sensors, radar sensors and/or a biosensor.

Benefits of the technology disclosed include that a spontaneous mutation of a composition of microorganisms initially added to a first treatment process, and that is indicated by at least one of received sensor data or process variables to improve the treatment process, may be extracted and used again in a second treatment process. Further benefits of the technology disclosed include that a spontaneous mutation of a composition of microorganisms initially added to a first biological treatment process, e.g. a first wastewater treatment process of a first wastewater treatment system, and is indicated by received sensor data and/or process variables to improve the treatment process, may be extracted from the first biological treatment process and used for a second biological treatment process of a second treatment system, e.g. a second wastewater treatment system remotely located from the first treatment system.

The control system of each of the plurality of sub-systems may then be configured to receive data or information from the sensors and/or cameras and then send data, based on said received data or information, to a master control unit. The master control unit may then be configured to analyze the data received from the control system of a sub-system and determine, based on the data received, whether it is time to extract a sample comprising a composition of microorganisms from a first sub-system among the plurality of sub-systems. The sample comprising a composition of microorganisms extracted from the first sub-system may then be stored and/or reused in a second sub-system, e.g. a second sub-system which is remotely located from the first sub-system. The data received by the master control unit from the sub-systems may also include process variables. The data on which the determining of whether it is time to extract a sample comprising a composition of microorganisms may then be based on at least one of process variables and sensor data related to the biological behavior of microorganisms. The benefits of the technology disclosed include that a spontaneous mutation of a composition of microorganisms initially added to a treatment process, and that is indicated to improve the treatment process, may be extracted and used again in a separate treatment process. Further benefits of the technology disclosed include that a spontaneous mutation of a composition of microorganisms initially added to a first biological treatment process, e.g. a first wastewater treatment process of a first wastewater treatment system, and is indicated to improve the treatment process, may be extracted from the first biological treatment process and used for a second biological treatment process of a second treatment system, e.g. a second wastewater treatment system remotely located from the first treatment system.

In embodiments, the system comprises a plurality of sub-systems including a plurality of wastewater treatment systems and/or a plurality of fraction collector systems. A control system of the plurality of sub-systems may then be configured to receive data or information from sensors and/or cameras of the sub-system and then send data based on said received data or information to a master control unit. The master control unit may then be configured to analyze the data received from the control system of a sub-system and determine, based on the data received, whether it is time to extract a sample comprising a composition of microorganisms from a first sub-system among the plurality of sub-systems. The sample comprising a composition of microorganisms extracted from the first sub-system, e.g. a biological treatment system such as a wastewater treatment system, may then be stored and/or reused in a second sub-system, e.g. a second sub-system which is remotely located from the first sub-system. The data received by the master control unit from the sub-systems may also include process variables. The data on which the determining of whether it is time to extract a liquid sample of microbe cultures of microorganisms may then be based on at least one of process variables and data related to the biological behavior of at least one microbe culture of microorganisms used for biologically breaking down wastewater. The benefits of the technology disclosed include that a spontaneous mutation of a composition of microorganisms initially added to a treatment process, and that is indicated to improve the treatment process, may be extracted as a sample and added to a separate treatment process from the treatment process the sample was extracted. Further benefits of the technology disclosed include that a spontaneous mutation of a composition of microorganisms initially added to a first biological treatment process, e.g. a first wastewater treatment process of a first wastewater treatment system, and is indicated to improve the treatment process, may be extracted from the first biological treatment process and added to a second biological treatment process of a second treatment system, e.g. a second wastewater treatment system remotely located from the first treatment system.

BRIEF DESCRIPTION OF DRAWINGS

Embodiments of the invention will now be described in more detail with reference to the appended drawings, wherein.

DETAILED DESCRIPTION

Figure 1:
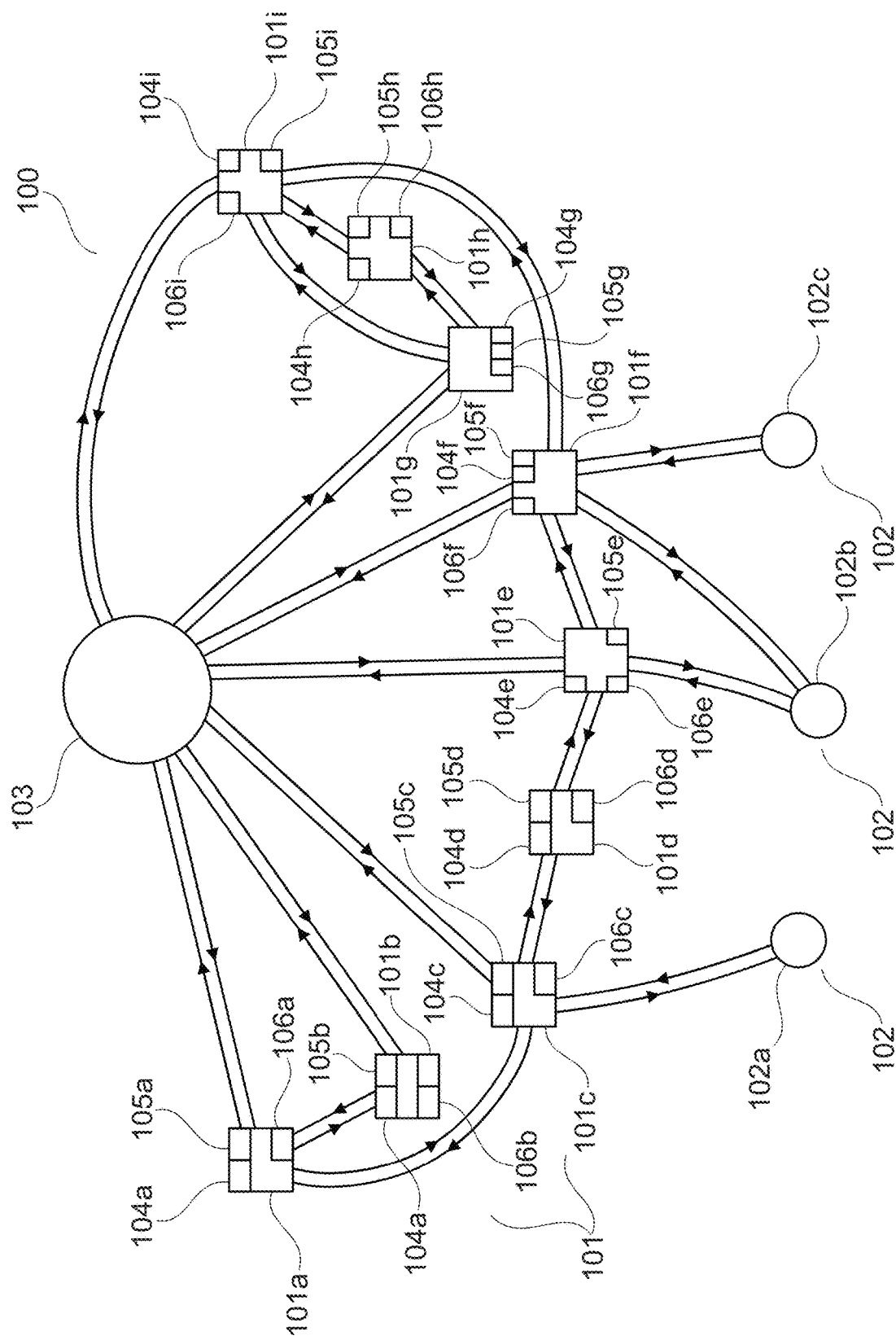
FIG. 1 shows a system according to the technology disclosed which is comprising a master control unit and a plurality of wastewater treatment sub-systems.

As used herein, the terms "process variable" and "process-related parameter values" refers to at least one of process variables and parameter values for controlling a biological treatment process for biologically breaking down at least one of fat, oil and grease (FOG).

In embodiments, the terms "process variable" and "process-related parameter values" used in this disclosure may include process variables, process schemes and process parameters for controlling the adding/dosing/spraying of a composition of microorganisms for improving the biological process for breaking down FOG, e.g. process variables, process schemes and process parameters for controlling the added/dosed/sprayed amounts of microorganisms per time unit.

In embodiments, the terms "process variable" and "process-related parameter values" used in this disclosure may include process variables, process schemes and process parameters for controlling the adding/injecting/spraying of an oxygen-containing gas, for example air, for stimulating the growth of microorganisms and thereby improve the biological process for breaking down FOG, e.g. process variables, process schemes and process parameters for controlling the added/injected/sprayed amounts of oxygen-containing gas per time unit.

In embodiments, the terms "process variable" and "process-related parameter values" used in this disclosure may include process variables, process schemes and process parameters for controlling the heat actively added to a biological treatment zone/area of a system for stimulating the growth of microorganisms and thereby improve the biological treatment process for biologically breaking down fat, oil and/or grease (FOG), e.g. process variables, process schemes and process parameters for controlling the heat added per time unit, e.g. using a separate heater unit/system.

In embodiments, the terms "process variable" and "process-related parameter values" used in this disclosure may include process variables, process schemes and process parameters for controlling the cooling down of a biological treatment zone/area of a system to thereby improve the overall biological treatment process for biologically breaking down fat, oil and/or grease (FOG), e.g. process variables, process schemes and process parameters for controlling the cooling down in the biological treatment zone per time unit, e.g. using a separate heater unit/system.

In different embodiments, the terms "process variable" and "process-related parameter values" used in this disclosure may include process variables, process schemes and process parameters for controlling e.g. the quantities/amounts of waste added to and/or removed from a waste tank in a waste management system, and/or the flow of wastewater added to a wastewater treatment tank, e.g. process variables, process schemes and process parameters for controlling the quantities/amounts of waste added to and/or removed from a waste tank per time unit, process variables, process schemes and process parameters for controlling the flow of wastewater in the inlet or outlet of a wastewater treatment tank per time unit.

As used herein, the term "wastewater" refers to a stream of waste, bearing at least one undesirable constituent capable of being converted by microorganisms, deliverable to the wastewater treatment system for treatment. More specifically, the undesirable constituent may be a biodegradable material, such as an inorganic or organic compound that participates or is involved in the metabolism of a microorganism. For example, the undesirable constituent may include nitrate, nitrite, phosphorous, ammonia, and the like, typically present in wastewater. The type and concentration of undesirable constituents present in the wastewater may be site-specific. Communities may establish regulations regarding these undesirable constituents. For the purposes of the present description, wastewater refers to what is fed to the system and what is treated throughout.

It is often very time consuming an requires a lot of research work and efforts to identify a culture/composition of microorganisms that is efficient for a certain treatment process for biologically breaking down waste or wastewater. It is therefore an object of the technology disclosed to provide a solution and system which is more efficient in detecting and determining that a certain culture/composition of microorganisms is performing well in breaking down waste, wastewater or accumulated fat, oil and/or grease. The collected sample may then be a spontaneous mutation of the microbe culture of microorganisms initially used for the treatment process, e.g. a spontaneous mutation of the culture/composition of microorganisms initially added to a biological treatment zone or surface area for the purpose of breaking down fat, oil and/or grease. The spontaneous mutation may then be performing even better in breaking down fat, oil and/or grease than the culture/composition of microorganisms initially added to a biological treatment zone or surface area for the purpose of breaking down fat, oil and/or grease.

In aspects, an object of the technology disclosed is to detect any change in the bioprocess, to the better or worse, in terms of biodegradation of FOG and which triggers the collecting of a sample and, optionally, further analysis to determine if the change in microculture has occurred that could be used as either a starting culture in any other biosystem in other sites or as a sample for further product development of the initiative induced microculture.

In aspects, the system of the technology disclosed will detect any change in the bioprocess to the better or worse in terms of biodegradation of FOG and would therefore trigger a sample and analysis to determine if the change in microculture has occurred that could be used as either a starting culture in any other biosystem in other sites or as a sample for further product development of the initiative induced microculture.

In aspects, it is an object of the technology disclosed to provide methods and systems for determining or detecting whether a change in a biological process has occurred at least partly based on obtained sensor data related to the biological process, where the obtained sensor data may explicitly indicate a change in the biological process. An indication of a change in the biological process, which is at least partly based on the obtained sensor data, may trigger the collecting of a sample and, optionally, a further analysis of the collected sample. The analysis of the sample may determine if a change in the microculture has occurred In aspects, it is an object of the technology disclosed to provide methods and systems for determining or detecting that a spontaneous mutation of the microculture initially added to biological treatment process has occurred and/or that a change in the composition of microorganisms has occurred, e.g. a change in the ratio of different microorganisms.

In aspects, it is an object of the technology disclosed to provide methods and systems for reusing a sample of microculture, or culture of microorganisms, which is collected from a first biological treatment system as either a starting culture in a second biological treatment system, where the second biological treatment system may be located at a different site from the first biological treatment system. In certain aspects, the technology disclosed provides methods and system for further product development of the microculture, or culture of microorganisms, in the collected sample. The collected sample containing the microculture, or culture of microorganisms, may then be collected from a biological treatment zone of the first biological treatment system and the collected sample may be suitable for biologically treating fat, oil and/or grease (FOG), suitable for breaking down fat, oil and/or grease and/or suitable for partial biodegradation of fat, oil and/or grease.

In certain aspects, it is an object of the technology disclosed to provide a master control unit, communicatively coupled to the system, for determining, at least partly based on obtained sensor data received from the system and/or another biological treatment system, that a change in the biological process has occurred. The collected sample containing the microculture, or culture of microorganisms, may then be collected from a biological treatment zone of the system and the collected sample may be suitable for biologically treating fat, oil and/or grease (FOG), suitable for breaking down fat, oil and/or grease and/or suitable for partial biodegradation of fat, oil and/or grease.

In aspects, it is an object of the technology disclosed to provide methods for detecting a change in a biological process at least partly based on obtained sensor data related to the biological process, where the obtained sensor data may explicitly indicate a change in the biological process. A change in the biological process which may be determined at least based on the obtained, e.g. collected or received sensor data, may trigger the collecting of a sample and, optionally, and may further trigger the performing of an analysis of the collected sample.

In certain aspects, it is an object of the technology disclosed to perform an analysis of the sample may determine if a change in the microculture has occurred, e.g. that a spontaneous mutation has occurred, e.g. of the microculture initially added to biological treatment process, and/or that a change in the composition of microorganisms has occurred, e.g. a change in the ratio of different microorganisms change in the composition of microorganisms. A microculture in the collected sample could be used as either a starting culture in any other biological treatment system, e.g. at other sites, or as a sample for further product development of a microculture in the collected sample. The system, or a master control unit communicatively coupled to the system, of the technology disclosed may determine, at least partly based on obtained sensor data, that a change in the biological process has occurred. The collected sample containing the microculture, or culture of microorganisms, may then be collected from a biological treatment zone of the system and the collected sample may be suitable for biologically treating fat, oil and/or grease (FOG), e.g. suitable for breaking down fat, oil and/or grease and/or suitable for partial biodegradation of fat, oil and/or grease.

It is a further object of the technology disclosed to provide methods, a system and devices for detecting and determining that a certain culture/composition of microorganisms is performing well and that a sample of certain culture/composition of microorganisms should be collected and be reused in another treatment process for biologically breaking down waste or wastewater. The collected sample may then be a spontaneous mutation of the microbe culture of microorganisms initially used for the treatment process, e.g. a spontaneous mutation of a culture/composition of microorganisms initially added to a biological treatment zone or surface area for the purpose of breaking down fat, oil and/or grease. The spontaneous mutation may then be performing even better in breaking down fat, oil and/or grease than the culture/composition of microorganisms initially added to a biological treatment zone or surface area for the purpose of breaking down fat, oil and/or grease.

It is a further object of the technology disclosed to provide methods, a system and devices for determining that a certain culture/composition of microorganisms is performing well in a certain environment of a first treatment process using certain identified parameters values for certain process variables, where a sample of certain culture/composition of microorganisms is collected and reused in a second separate treatment process for biologically breaking down waste, wastewater, accumulated FOG and/or polluted air streams. The collected sample may then be a spontaneous mutation of the microbe culture of microorganisms initially used for and added to the first treatment process. In embodiments, the identified parameter values for the process variables of the first treatment process may then be used for the second treatment process when the collected sample of culture/composition of microorganisms is added to the second treatment process, e.g. a treatment process for biologically breaking down waste, wastewater, accumulated FOG and/or polluted air stream.

In embodiments, the technology disclosed describes how biotechnology can be used to transform or convert waste and/or wastewater into raw materials, and/or to cleanse polluted air streams, in a cost-effective and energy-efficient manner.

In embodiments, the technology disclosed relates to methods, systems and devices for sharing data and/or information for the purpose of controlling processes in another system or sub-system which is also using microorganisms for biological treatment of wastewater.

In embodiments, the technology disclosed relates to methods, a system and apparatuses comprising control units for sharing data and/or information between sub-systems and/or a master control unit, for the purpose of controlling a treatment process in a sub-system, where the sub-system is using microorganisms for at least one of treatment of waste and/or wastewater, accumulated FOG and for purification of air streams containing high amounts of particles of fat, oil and/or grease.

In embodiments, the technology disclosed further relates to methods, systems comprising at least one of sensor data, soft sensor data, image data, process variables, IoT (Internet of Things), machine-learning algorithms, deep learning algorithms and artificial intelligence for determining whether and when to collect a sample containing a culture or microorganisms and/or for changing a treatment process. Historic data and/or environmental variables may also be used as input data for determining whether and when to collect a sample containing a culture or microorganisms, or when not to collect a sample.

In embodiments, the technology disclosed involves adding a beneficial composition/culture of microorganisms and/or changing at least one process variable of at least one process for the treatment of wastewater in a wastewater treatment system, or in a process for the treatment of waste in a waste management system.

In embodiments, the technology disclosed relates to methods, systems comprising at least one of sensor data, image data, process variables, IoT (Internet of Things), machine-learning algorithms, deep learning algorithms and artificial intelligence for changing a treatment process which involves adding a composition/culture of microorganism and/or changing at least one process variable of at least one process for the treatment of wastewater in a wastewater treatment system, or for the treatment of waste in a waste management system.

In embodiments, the technology disclosed proposes a new way of using biotechnology together with IoT (Internet of Things), machine-learning algorithms, deep learning algorithms and artificial intelligence. The technology disclosed further relates to methods for detecting and/or determining that a composition/culture of microorganisms involved in a treatment process is performing well.

In embodiments, the technology disclosed relates to methods, systems for sharing data and/or information for the purpose of controlling processes in sub-systems using microorganisms for at least one of treatment of wastewater, treatment of waste and purification of air.

In embodiments, the technology disclosed relates to a method, a system and an apparatus for sharing data and/or information between sub-systems and/or a master control unit for the purpose of controlling a treatment process in a sub-system, where the sub-system is using microorganisms for at least one of treatment of wastewater and purification of air. The technology disclosed further relates to methods, systems comprising at least one of sensor data, image data, process variables, soft sensor data, IoT (Internet of Things), machine-learning algorithms, deep learning algorithms and artificial intelligence for changing a treatment process. The technology disclosed may involve adding a composition/culture of microorganism and/or changing at least one process variable of at least one process for the treatment of wastewater in a wastewater treatment system, or for the treatment of waste in a waste management system.

In embodiments, the technology disclosed relates to methods, systems comprising at least one of sensor data, soft sensor data, image data, process variables, IoT (Internet of Things), machine-learning algorithms, deep learning algorithms and artificial intelligence for changing a treatment process which involves adding a composition/culture of microorganism and/or changing at least one process variable of at least one process for the treatment of wastewater in a wastewater treatment system, or for the biological treatment of waste in a waste management system.

In embodiments, the technology disclosed describes various solutions for how biotechnology, IoT and artificial intelligence interact with the common purpose of converting wastewater to raw materials and clean water, e.g. a society where biotechnology is used to recover waste and water but also to clean sewage. The result is a city with clean drinking water, functioning sewage, and that is almost free from dumps. In addition, the combination of biotechnology, IoT and artificial intelligence may according to the technology disclosed also be used for other applications such as in construction, e.g. repairing damaged concrete, creating clothes or food.

In certain aspect, the objects of the technology disclosed include converting wastewater back into clean water with the use of microorganisms. In certain aspects, it is an object of the technology disclosed to provide a method, a system and a plurality of wastewater treatment systems, where each wastewater treatment systems comprises a control unit communicatively coupled to the control units of other wastewater treatment systems and configured to share data and/or information with the control units of other wastewater treatment systems. The data and/or information that is shared between the control units of the plurality of wastewater treatment systems may data and/or information related to at least one of sensor data, captured images or image data and process variables. In embodiments, at least one of the plurality of wastewater treatment systems is a wastewater treatment system for biologically breaking down wastewater by adding microorganisms to a treatment process. Thus, the technology disclosed relates to methods for indicating, based on at least one of sensor data, captured images and process variables and/or calculations from received data, that a composition/culture of microorganisms involved in a process for treatment of wastewater is performing well and that a sample containing the composition/culture of microorganisms should be collected or extracted from the treatment process to be used for another separate wastewater treatment process.

In certain aspects, the objects of the technology disclosed include converting wastewater back into raw materials and clean water, and this with low energy consumption. In certain aspects, it is an object of the technology disclosed to provide a method, a system and a plurality of wastewater tanks for the treatment of wastewater containing a mixture of sanitary wastewater, containing relatively high concentrations of feces and cellulose, and wastewater containing relatively high concentrations of fat, oil and grease (FOG).

In certain aspects, the technology disclosed describes various solutions for how biotechnology, IoT and artificial intelligence interact with the common purpose of converting wastewater to raw materials and clean water, e.g. a society where biotechnology is used to recover waste and water but also to clean sewage. The result is a city with clean drinking water, functioning sewage, and that is almost free from dumps. In addition, the combination of biotechnology, IoT, machine/deep learning and artificial intelligence may according to the technology disclosed also be used for other applications such as in construction, e.g. repairing damaged concrete, creating clothes or food.

According to aspects, the objects of the technology disclosed include providing a method, a system and a plurality of biological treatment systems for biologically breaking down fat, oil and/or grease (FOG), where each treatment system comprises a control unit communicatively coupled to the control units of other systems and which is configured to share data and/or information with the control units of the other biological treatment systems. The data and/or information that is shared between the control units of the plurality of wastewater treatment systems may be data and/or information which is at least partly based on at least one of sensor data, such as image data or audio data, and/or may be process variables such as process-related parameter values. In embodiments, at least one of the plurality of biological treatment systems is at least one of a waste management system and a wastewater treatment system by adding/dosing a culture of microorganisms.

According to certain aspects, the objects of the technology disclosed include providing a method, a master control unit and a plurality of biological treatment systems for biologically breaking down fat, oil and/or grease (FOG), where each biological treatment system comprises a control unit communicatively coupled to the control units of other systems and which is configured to share data and/or information with the master control units. The data and/or information that is shared with the master control unit may at least partly be based on at least one of sensor data, such as image data or audio data, and/or may be process variables such as process-related parameter values. In embodiments, at least one of the plurality of biological treatment systems is at least one of a waste management system and a wastewater treatment system by adding/dosing/spraying a certain composition of microorganisms for improving the biological process for breaking down FOG.

In certain aspects, the objects of the technology disclosed include converting wastewater back into clean water with the use of microorganisms. In certain aspects, it is an object of the technology disclosed to provide a method, a system and a plurality of wastewater treatment systems, where each wastewater treatment system comprises a control unit communicatively coupled to the control units of other wastewater treatment systems and configured to share data and/or information with the control units of other wastewater treatment systems. The data and/or information that is shared between the control units of the plurality of wastewater treatment systems may data and/or information related to at least one of sensor data, images and process variables. In embodiments, at least one of the plurality of wastewater treatment systems is a wastewater treatment system for biologically breaking down wastewater by adding microorganisms to a treatment process.

In certain aspects of the technology disclosed, the system comprises a master control unit remotely located from at least one of a plurality of sub-systems including a first and a second sub-system. The master control unit may then be configured to receive, from at least one of the plurality of sub-systems, data related to a treatment or separation process for at least one of the plurality of sub-systems. The plurality of sub-systems may then include a plurality of wastewater treatment systems. In embodiments, the sub-systems further include at least one of a fraction collector, a waste management system and a treatment plant.

In certain embodiments, the fraction collector, or separator, may include a cyclone, a hydrocyclone, a centrifuge, a sedimentation tank, a sedimentation column, a filter, and the like. The fraction collector may further include a gravimetric separator with the ability to select for good settling solids by means of gravimetric selection in the gravimetric selector through e.g., direct wasting from a mixed liquor.

In embodiments, a plurality of the plurality of sub-systems are communicatively coupled to and configured to at least one of receive and exchange data or information with at least one other device or system, and wherein said other device or system include at least one of a booking system, a weather report system and a dishwasher.

In embodiments, a master control unit communicatively coupled to a plurality of sub-systems are communicatively coupled to and configured to at least one of receive and exchange data or information directly from at least one other device or system, where the at least one other device or system include at least one of a booking system, a weather report system and a dishwasher.

In embodiments, the master control unit is configured to determine, based on data or information received from a first sub-system among a plurality of sub-systems, that it is time to extract a sample from the process of said first sub-systems. In certain embodiments, the data or information is received from a first wastewater treatment system among a plurality of wastewater treatment systems and is indicating that it is time to extract a liquid sample of microbe cultures of microorganisms from said first wastewater treatment system.

In embodiments, the received data on which the determining of whether it is time to extract a liquid sample of microbe cultures of microorganisms is based on at least one of process variables and data related to the biological behavior of at least one microbe culture of microorganisms used for biologically breaking down wastewater.

In embodiments, the received data on which the decision whether it is time to extract a liquid sample of microbe cultures of microorganisms is based on at least one of process variables for said wastewater treatment process and data related to the biological behavior of said microbe cultures of microorganisms to be extracted.

In embodiments, the decision by the master control unit whether it is time to extract a liquid sample of microbe cultures of microorganisms is at least partly based on data processing operation and/or calculations performed by said master control unit.

In embodiments, these calculations are based on data received from the first wastewater treatment system, and wherein said received data is at least one of process variables for said wastewater treatment process and data related to the biological behavior of said microbe cultures of microorganisms.

In embodiments, the received data on which the decision by the master control unit whether it is time to extract a liquid sample of microbe cultures of microorganisms is based on at least one of measured sensor data and soft sensor data received from at least one of said plurality of wastewater treatment systems.

In embodiments, the received data on which the decision by the master control unit whether it is time to extract a liquid sample of microbe cultures of microorganisms is based on at least one of measured sensor data and soft sensor data received from a plurality of wastewater treatment systems among said plurality of wastewater treatment systems.

In embodiments, the sensor data is sensor data measured by at least one sensor associated with said wastewater treatment system from which said microbe culture of microorganisms is to be extracted.

In embodiments, the master control unit is further configured to send control/instruction data for changing at least one process variable, process scheme and/or process parameter value for the wastewater treatment process of said second wastewater treatment systems, and wherein said control data is at least partly based on data received from said first wastewater treatment system. In certain embodiments, the decision by the master control unit whether to send control/instruction data for changing at least one process variable, process scheme and/or process parameter value may in addition be at least partly based on data or information exchanged with and/or received from at least one other device or system, wherein the at least one other device or system may include at least one of the booking system for at least one restaurant, a weather report system, a control system/unit for monitoring air pollution in air or air streams, a control system/unit for monitoring/detecting the outflow of wastewater from at least one kitchen and/or restaurant, and/or a dishwasher control unit.

In embodiments, the master control unit is configured to receive, from said first wastewater treatment system and via a data communications network, sensor data related to said first wastewater treatment process, and wherein said master control unit is further configured to send control data to said second wastewater treatment system for changing the wastewater treatment process for said second wastewater treatment system at least partly based on said sensor data received from said first wastewater treatment system.

In embodiments, the data received by said master control unit includes sensor data measured by a sensor associated with said first wastewater treatment process, and wherein said master control unit is configured to send control data for changing process parameters for said second wastewater treatment system at least partly based on said received sensor data.

In embodiments, the first and second wastewater treatment system are both configured for biologically breaking down wastewater and are provided with mutually different compositions of microbe cultures of microorganisms.

In embodiments, the data received by the master control unit includes data related to the biological behavior of a first composition of microbe cultures of microorganisms of said first wastewater treatment process.

In embodiments, the master control unit is configured to identify that said first liquid sample of microbe cultures of microorganisms is suitable for said second wastewater treatment process based on said received data related to the biological behavior of said first liquid sample of microbe cultures of microorganisms.

In embodiments, the master control unit is configured to receive, from said first wastewater treatment system, both process variables and sensor data related to said first wastewater treatment process, and wherein said master control unit is further configured to, at least partly based on said received process variables and sensor data, identifying that a current microbe culture of microorganisms of said first wastewater treatment process is suitable for said second wastewater treatment process and in addition determine how process variables of said second wastewater treatment process needs to be changed to at least one of improve the current wastewater treatment process and/or better adapt the wastewater treatment process of said second wastewater treatment system to use a liquid sample of microbe culture of microorganisms extracted from said first wastewater treatment process.

In embodiments, the current microbe culture of microorganisms of the first wastewater treatment process is a different composition from the microbe culture of microorganisms initially used for the first wastewater treatment process. The current microbe culture of microorganisms of said first wastewater treatment process may be a spontaneous mutation of the microbe culture of microorganisms initially used for and added to the first wastewater treatment process.

In embodiments, the master control unit is further configured to send control data to said second wastewater treatment system for changing process variables of said second wastewater treatment process to thereby adapt the second wastewater treatment process to comprise a liquid sample of said current microbe culture of microorganisms extracted and received from said first wastewater treatment process of said first wastewater treatment system.

In embodiments, the received data includes measured sensor data about the biological behavior of a first microbe culture of microorganisms.

In embodiments, the master control unit is configured to identify a suitable microbe culture of microorganisms for said second wastewater treatment process at least partly based on said measured sensor data.

In embodiments, the received data includes data related to process variables of said first wastewater treatment process for biologically breaking down wastewater.

In embodiments, the master control unit is configured to send control data, to said second wastewater treatment system, for changing a process variable for the wastewater treatment process of said second wastewater treatment system based on the received data related to process variables of the first wastewater treatment process.

In embodiments, the master control units and the first and a second wastewater treatment system are remotely located from each other by a distance of at least 100 m.

In embodiments, the master control units and the first and a second wastewater treatment system are remotely located from each other by a distance of at least 1000 m.

In embodiments, the first and a second wastewater treatment system are remotely located from each other by a distance of at least 100 m.

In embodiments, the first and a second wastewater treatment system are remotely located from each other by a distance of at least 1000 m.

FIG. 1 shows a system (100) comprising a master control unit (103) and a plurality of sub-systems (101). The plurality of sub-systems (101) in FIG. 1 are communicatively coupled to and configured to at least one of receive, share and exchange data or information with other sub-systems (101) as well as other devices (102). The other devices (102) include a booking system (102a), a weather report system (102b) and a dishwasher (102c). The data received by the master control unit ( )include sensor data measured by sensors (104a, 104b, 104c, 104d, 104e, 104f, 104g, 104h, 104i) comprised in and associated with the plurality of sub-systems (101a, 101b, 101c, 101d, 101e, 101f, 101g, 101h, 101i) and/or image data or at least one captured image taken by a camera (105a, 105b, 105c, 105d, 105e, 105f, 105g, 105h, 105i) of a sub-system. The master control unit in FIG. 1 (103) is configured to send control data for changing process parameters for a second treatment process of a second sub-system (101b) at least partly based on received process variables and/or sensor data measured by a sensor of a first treatment process of a first sub-system (101a). The sub-systems (101) in FIG. 1 include at least a plurality of wastewater treatment systems (101a, 101b), a plurality of fraction collectors (101c, 101d), a plurality of waste management systems (101e, 101f), a treatment plant (101g) and a plurality of ventilation systems (101h, 101i) for purifying air.

The plurality of sub-systems, or treatment systems (101a, 101b, 101c, 101d, 101e, 101f, 101g, 101h, 101i) in FIG. 1 each comprises a control unit (106a, 106b, 106c, 106d, 106e, 106f, 106g, 106h, 106i) communicatively coupled to both the master control unit (103) and the control units of other treatment system for biologically breaking down waste and/or wastewater, or purifying air. The master control unit 103 and the control units (106a, 106b, 106c, 106d, 106e, 106f, 106g, 106h, 106i) in FIG. 1 comprise a processor for processing data and which is configured to perform calculations. The control units of the treatment systems are configured to send, receive and/or share data and/or information related their own treatment process, e.g. measured sensor data, captured images or parameter values for process variables, with the control units of at least one other sub-system. The plurality of sub-systems (101) of the system (100) include a plurality of wastewater treatment systems (101a, 101b) for biologically breaking down wastewater, a plurality of fraction collectors (101c, 101d), a plurality of waste management system (101e, 101f), a treatment plant (101g), and a plurality of ventilation systems (101h, 101i) for purifying air. In addition, the plurality of sub-systems are communicatively coupled to and configured to at least one of receive and exchange data or information with at least one other device or system (102). The other device or system in FIG. 1 include a booking system (102a), a weather report system (102b) and a dishwasher (102c).

Figure 2:
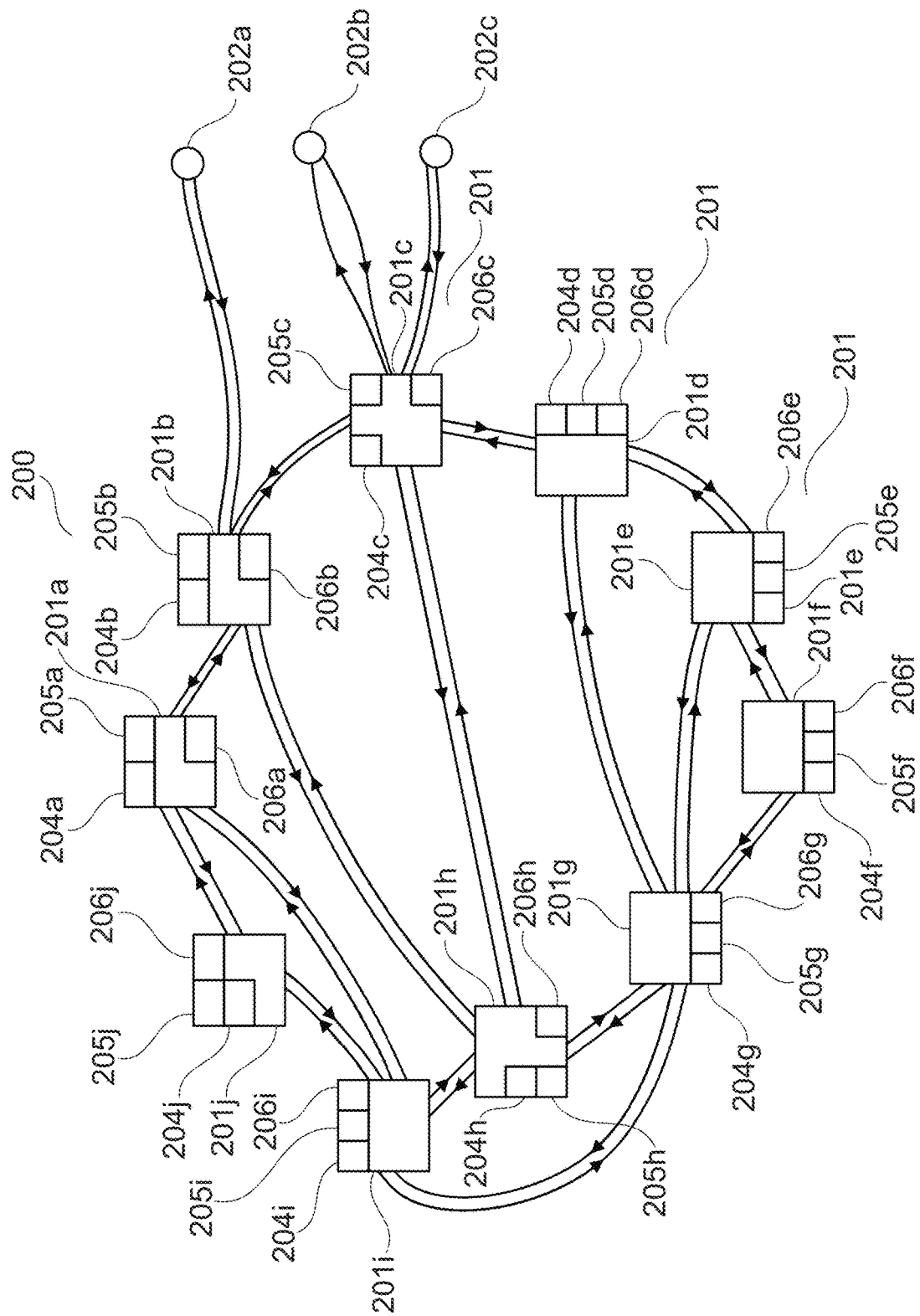
FIG. 2 shows a system comprising a plurality of sub-systems including a plurality of wastewater treatment systems.

FIG. 2 shows a system (200) comprising a plurality of sub-systems (201), where each of the plurality of sub-systems (201a, 201b, 201c, 201d, 201e, 201f, 201g, 201h, 101i, 201j) comprises a control unit (206a, 206b, 206c, 206d, 206e, 206f, 206g, 206h, 206i, 206j) communicatively coupled to the control units of other sub-systems. Each of the sub-systems in FIG. 2 has a sensor (204a, 204b, 204c, 204d, 204e, 204f, 204g, 204h, 204i, 204j) for measuring sensor data and a camera (205a, 205b, 205c, 205d, 205e, 205f, 205g, 205h, 205i, 205j) for taking images. The control unit (206a) of a first sub-system (201a) is configured to share data and/or information with the control units of other sub-systems. Data received by the control unit (206b) of a second sub-system (202b) include at least one of process variables related to the treatment process, and/or image data or at least one captured image taken by a camera (205a) of the first sub-system (202a), and/or sensor data measured by a sensor (204a) associated with the first sub-system (202a). The control unit (206a) of the first sub-system (201a) is configured to send control data for changing process parameters of the treatment process of the second sub-system (201b) at least partly based on the received sensor data. The data and/or information that is shared between the control units (206a, 206b, 206c, 206d, 206e, 206f, 206g, 206h, 206i, 206j) of the plurality of sub-systems (201a, 201b, 201c, 201d, 201e, 201f, 201g, 201h, 201i, 201j) is data and/or information related to at least one of sensor data, images and process variables. The sub-systems (201) in FIG. 2 include a plurality of wastewater treatment systems (201a, 201b), a plurality of waste management systems (201c, 201d), a plurality of fraction collectors (201e, 201f), a plurality of treatment plants (201g, 201h) and a plurality of ventilation systems (201i, 201j) for purifying air. The control units of the plurality of sub-systems in FIG. 2 are communicatively coupled to and configured to at least one of receive and exchange data or information with other devices. These other devices in FIG. 2 include a booking system, a weather report system and a dishwasher.

The plurality of sub-systems, or treatment systems, in FIG. 2 comprise a control unit communicatively coupled to the control units of other treatment system for biologically breaking down waste and/or wastewater, or purifying air. The control units of the sub-systems in FIG. 1 comprise a processor for processing data and which is configured to perform calculations. The control units of the treatment systems are configured to send, receive and/or share data and/or information related their own treatment process, e.g. measured sensor data, captured images or parameter values for process variables, with the control units of at least one other sub-system. The plurality of sub-systems of the system include a plurality of wastewater treatment systems for biologically breaking down wastewater, a plurality of fraction collectors, a plurality of waste management system and a plurality of treatment plants. In addition, the plurality of sub-systems are communicatively coupled to and configured to at least one of receive and exchange data or information with at least one other device or system. The other device or system in FIG. 1 includes a booking system, a weather report system and a dishwasher.

Figure 3:
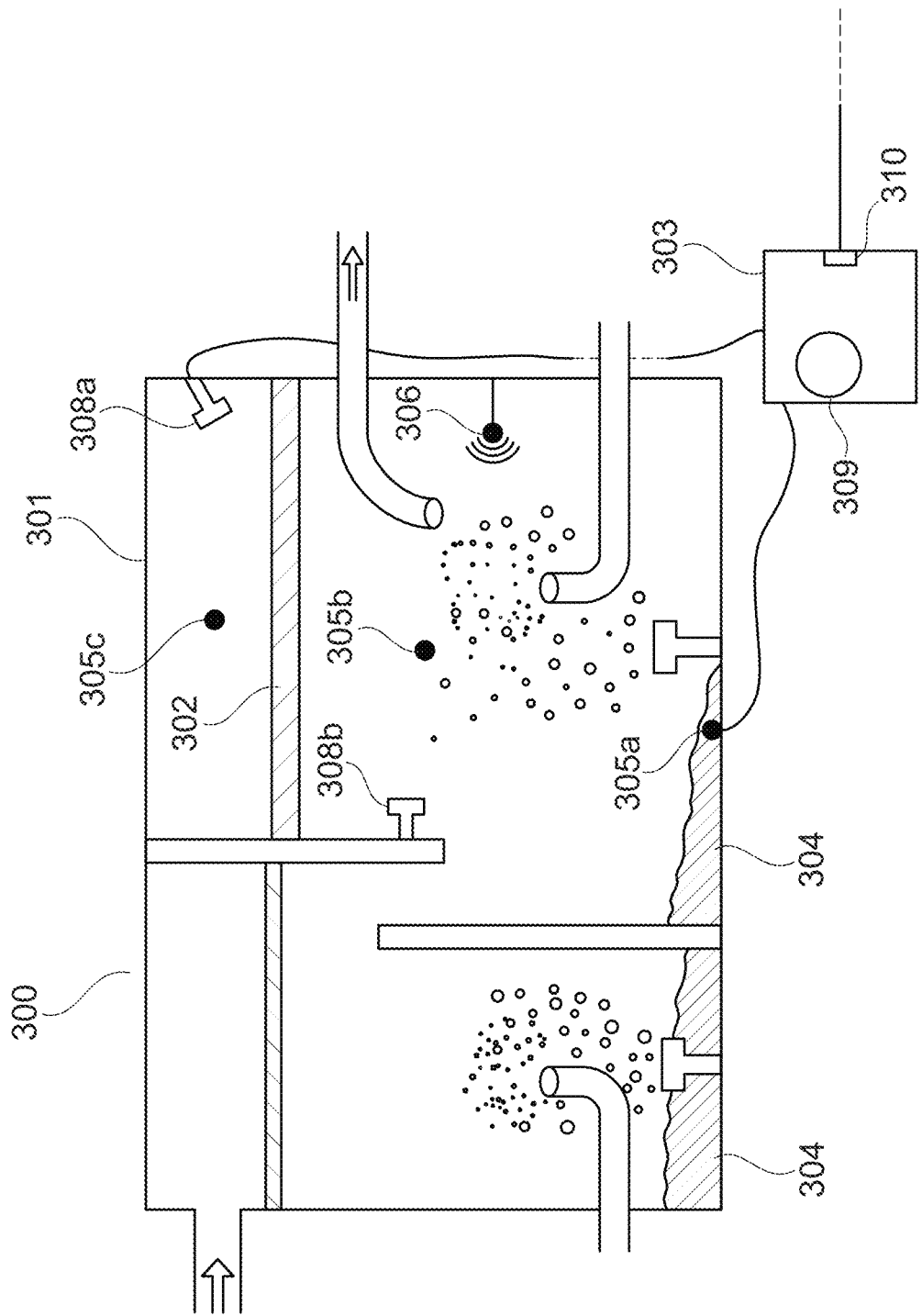
FIG. 3 illustrates a wastewater treatment system according to embodiments of the technology disclosed.

FIG. 3 shows an example embodiment of a wastewater treatment system (300) comprising three microphones (305a, 305b, 305c). At least one of the three microphones (305a, 305b, 305c) is used for determining, detecting and/or measuring the thickness of the fat/FOG cake (302) in the wastewater treatment tank (301), and may also be used for determining the amounts of foam. In this embodiment, a data processing unit (307) is used for processing the data obtained by at least one of the microphones (305a, 305b, 305c). Data, which is at least partly based on the measured/detected thickness of the fat/FOG cake (302) and/or the obtained audio data, or audio characteristics, is sent from a control system (303) of the wastewater treatment system (300) to at least one of a remotely located master control unit (not shown) and/or a control system of another second wastewater treatment system (not shown) that is remotely located from the wastewater treatment system (300). The control system (303) comprises a transmitter (310) for transmitting the data to the remotely located master control unit and/or the control system of the other second wastewater treatment.

One of the three microphones in the example embodiment of the technology disclosed illustrated in FIG. 3 is located at the bottom of the tank (305a) under the sludge (304), one of the microphones is located in the tank (305b) enclosed by water and one of the microphones is located in the upper part of the tank (305c), above the fat/FOG cake and surrounded by air. The microphone in the upper part of the tank above the fat/FOG cake is configured to measure and/or detect the thickness of the fat/FOG cake. The microphone in the tank enclosed by water (305b) is configured to register/detect the sound of air bubbles, which is audibly affected by the thickness of the fat/FOG cake, by collecting audio data. The amount of air in the tank may also affect echoes, which should result in the determination of volume of air and the resultant level of liquid and fat. In the embodiment of a wastewater treatment system (300) shown in FIG. 3, a sound source (306) is generating an audio impulse or sound impulse, e.g. a pre-defined audio or sound impulse, which is detected with at least one of the three microphones (305a, 305b, 305c). In certain embodiments, the data processing unit (307) in FIG. 3 may be used for determining the thickness of the fat/FOG cake (302) by analyzing or processing audio data, or pre-processed audio data, received from at least one of the microphones (305*a*, 305*b*, 305*c*). In certain embodiments, the data processing unit (307) in FIG. 3 may be used for detecting noise such as noise from pumps of the wastewater treatment tank by analyzing or processing audio data, or pre-processed audio data, received from at least one of the microphones (305*a*, 305*b*, 305*c*).

The wastewater treatment tank (301) in the embodiment illustrated in FIG. 3 further comprises cameras (308*a*, 308*b*) for determining the thickness of the fat/FOG cake and/or the thickness/amount of sludge in the wastewater treatment tank. The first camera (308*a*) is configured for determining the amounts of foam and the characteristics of the foam formed on the fat/FOG cake (302). The second camera (308*b*) is configured to be used for determining and/or detecting characteristics of the wastewater in the wastewater treatment tank, including the optical characteristics and visibility conditions in the wastewater. In the example embodiment of a wastewater treatment system (300) illustrated in FIG. 3, an image processing unit (309) is used for processing the image data obtained by at least one of the two cameras (308*a*, 308*b*). In certain embodiments, the data processing unit (307) in FIG. 3 may be used for determining the thickness of the fat/FOG cake (302) by analyzing or processing image data, or pre-processed image data, e.g. streamed or recorded video data, received from at least one of the two cameras (308*a*, 308*b*). The control system (303) in FIG. 3 further comprises a transmitter (310) for transmitting at least one of the obtained image data and/or analyzed or processed image to a remotely located master control unit (not shown) and/or the control system of another second wastewater treatment that is remotely located from the wastewater treatment system (300).

In embodiments, determine that a spontaneous mutation of the culture of microorganisms initially added to the treatment process is performing well and that a sample containing the spontaneous mutation of the culture of microorganisms may or should be collected from the biological treatment zone or surface area, and wherein said determining that a sample of the spontaneous mutation of the culture of microorganisms may or should be collected is at least partly based on said sensor data obtained by the at least one sensor device, camera and/or microphone.

Figure 4:
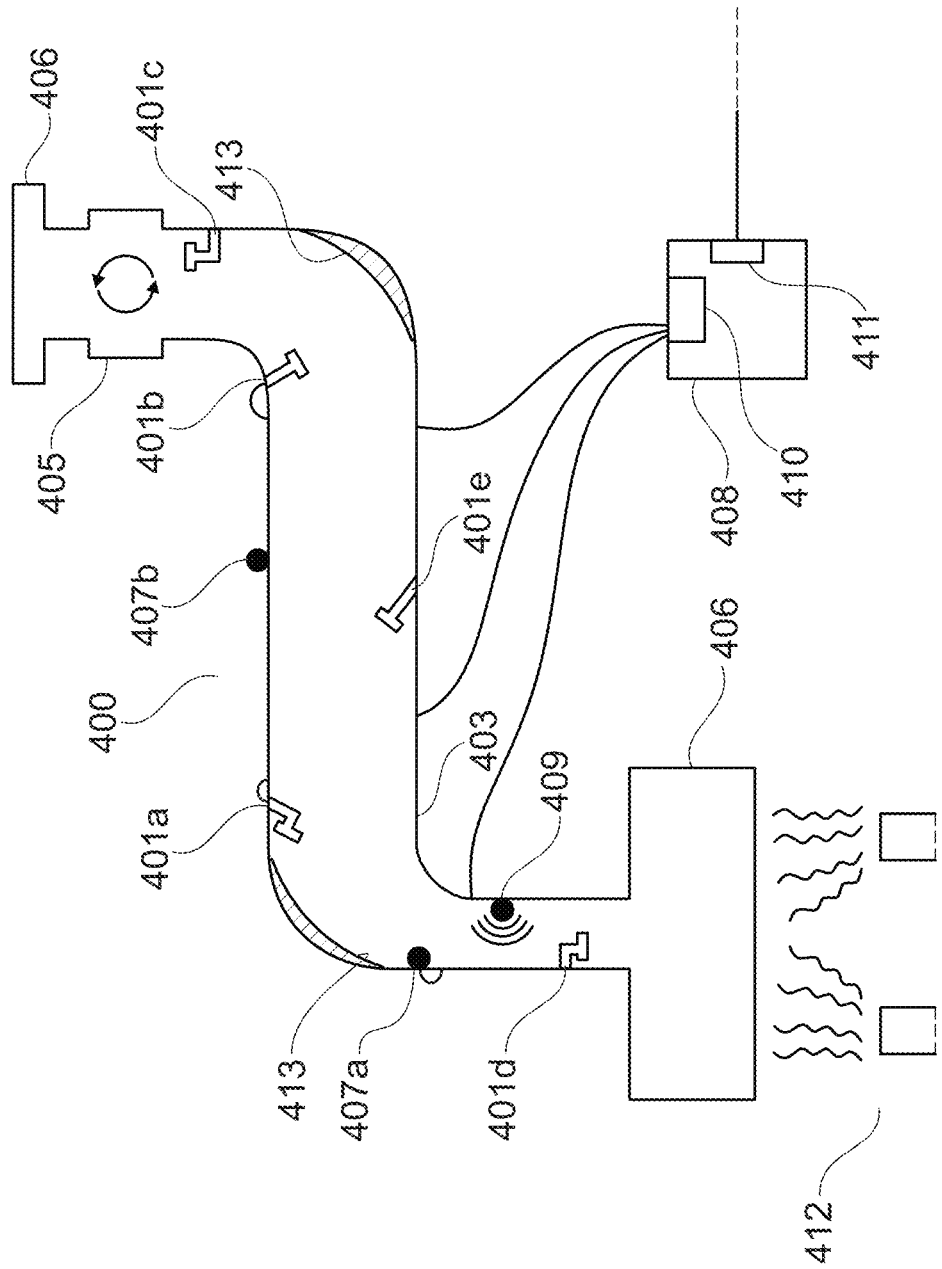
FIG. 4 illustrates a system for purifying air which may be communicatively connected to the system, wastewater treatment system and master control unit according to embodiments of the technology disclosed.

FIG. 4 illustrates an example embodiment of a system for purifying air (400) received from a kitchen area (412), where the system for purifying air comprises a ventilation duct (403), a plurality of cameras (401*a*, 401*b*, 401*c*, 401*d*, 401*e*), a control system (408) and nozzles (402*a*, 402*b*, 402*c*, 402*d*) for dosing, i.e. spraying, a liquid culture of microorganisms and/or a water vapor composition containing a culture of microorganisms, for improving the biological process for breaking down FOG. A data processing unit (410) of the control system (408) is used for processing the data obtained by at least one of the cameras (401*a*, 401*b*, 401*c*, 401*d*, 401*e*). Some of the cameras (401*a*, 401*b*) are located to be used of determining the amount of accumulated fat, oil and/or grease in the ventilation duct (403), e.g. the thickness of the layer of accumulated FOG. These cameras (401*a*, 401*b*) are located inside the ventilation duct (403) and are directed at the inside surface areas of the bends (413) of the duct (403) where it is more likely that fat, oil and grease (FOG) is accumulated. The nozzles (402*a*, 402*b*, 402*c*, 402*d*) for dosing/spraying the liquid culture of microorganisms and/or the water vapor composition are strategically located inside the ventilation duct (403) and are configured and directed to be dosing/spraying surface areas (404) on the inside surface area, where it is more likely that FOG is accumulated, with a culture/composition of microorganisms. Some of the nozzles (402*c*, 402*d*) for dosing/spraying the culture/composition of microorganisms for breaking down fat, oil and/or grease are located and directed at a heat exchanger (405) and a filter (406), respectively. Heat exchangers (405) and filters (406) tend to accumulate more fat, oil and grease than other parts or surface areas of the system. One of the cameras (401*c*) is directed at the heat exchanger (405) to detect accumulated fat, oil and/or grease in the heat exchanger (405). One of the cameras is directed at one of the filters (406) to detect accumulated fat, oil and/or grease in the filter (406). One of the cameras (401*e*) is an infrared camera, or detector, for detecting heat changes in the system for purifying air (400).

The control system (408) in FIG. 4 further comprises a transmitter (411) for transmitting at least one of the image data obtained by at least one of the cameras (401*a*, 401*b*, 401*c*, 401*d*, 401*e*) to a remotely located master control unit (not shown) and/or the control system of another system for purifying air that is remotely located from the system for purifying air (400).

The control system (408) in FIG. 4 further comprises a transmitter (411) for transmitting at least one of the obtained audio data and/or analysed or processed audio data to a remotely located master control unit (not shown) and/or the control system of another system for purifying air that is remotely located from the system for purifying air (400). Data or information which is at least partly based on the obtained audio/sound data, or audio characteristics, may also be sent by the transmitter of the control system/unit of another second system for purifying air (not shown), or to/via a remotely located master control unit (not shown), with the purpose of changing a process variable and/or process-related parameter values for controlling the biological treatment process of the other second system for purifying air.

In embodiments, the system is configured to determine that a culture of microorganisms is performing well, e.g. that a spontaneous mutation of the culture of microorganisms initially added to the treatment process is performing well, and that a sample containing the spontaneous mutation of the culture of microorganisms may or should be collected from the biological treatment zone or surface area, and wherein said determining that a sample of the culture of microorganisms may or should be collected is at least partly based on said sensor data obtained by the at least one sensor device, camera and/or microphone.

According to the different embodiments of the technology disclosed, the microorganisms may consist of bacteria, fungi, archaea, and protists. Microorganisms can be a single species or a mixture of consortia. Microorganisms can be natural or bioengineered and genetic-altered organisms.

The master control unit may be configured use received data including at least one of process variables for at least one of said wastewater treatment processes and data related to the biological behavior of at least one microbe culture of microorganisms to at least one of control, change and optimize the concentration of at least one substance and/or element in the wastewater flowing in the wastewater pipe system, or sewer pipe system.

In certain embodiments, the master control unit is configured to receive data from a plurality of said plurality of wastewater treatment systems and use said data received from a plurality of wastewater treatment systems to at least one of control, change and optimize the concentration of at least one substance and/or element in the wastewater flowing in the wastewater pipe system, or sewer pipe system.

In certain embodiments, the master control unit is further configured to send control data to at least one wastewater treatment system based on data received from said plurality of wastewater treatment systems, and wherein said control data is adapted to be used by said at least one wastewater treatment system to at least one of control and change a process variable, process-related parameter value and/or process scheme for the wastewater treatment process of said at least one wastewater treatment system.

In embodiments, the master control unit is further configured to send at least first control data and second control data to respective first and second wastewater treatment system based on data received from a plurality of wastewater treatment systems, and wherein said first and second control data is each adapted to be used by respective wastewater treatment system to at least one of control and change a process variable for the wastewater treatment process of the wastewater treatment system.

In embodiments, the master control unit is configured use data received from a plurality of wastewater systems including at least one of process variables and data related to the biological behavior of at least one microbe culture of microorganisms to at least one of control, change and optimize the concentration of at least one of substances and elements in the wastewater flowing in the wastewater pipe system, or sewer pipe system.

In embodiments, the master control unit is configured use data received from a plurality of wastewater systems including at least one of process variables and data related to the biological behavior of at least one microbe culture of microorganisms to at least one of control, change and optimize the concentration of at least one of substances and elements in the wastewater flowing at a location in the wastewater pipe system which is after said plurality of wastewater systems from which data is received.

In embodiments, the master control unit is configured use data received from a plurality of wastewater systems including at least one of process variables and data related to the biological behavior of at least one microbe culture of microorganisms to at least one of control, change and optimize the concentration of at least one of substances and elements in the wastewater flowing in the wastewater pipe system, at two separate locations in the wastewater pipe system.

In example embodiments, this certain concentration is a threshold limit concentration set for the wastewater tank to avoid pipe clogging caused by a high concentration of FOG or hydrocarbons, in the pipe system, or wastewater pipe system or sewer pipe system, receiving wastewater flowing out from the wastewater tank(s) of the technology disclosed, and other similar wastewater tanks contributing to the amount of FOG in the pipe system In certain embodiments, the technology disclosed relates to a system for wastewater treatment process control comprising a plurality of measuring means arranged to obtain a dataset, the dataset comprises a plurality of process variables related to a parameter of the wastewater treatment process; a prediction module arranged to receive the dataset and predict the parameter of wastewater treatment process utilizing a mathematical model, the mathematical model arranged to obtain the dataset as input and provides a predicted parameter as an output. The system for wastewater treatment process control may include a troubleshooting module arranged to compare the predicted parameter with a predetermined criterion. In the event the predicted parameter does not satisfy the predetermined criterion, the troubleshooting module may be configured to identify at least one process variable from the plurality of process variables which causes the predicted parameter not to satisfy the predetermined criterion.

In certain embodiments, the technology disclosed addresses the problem with the disturbance that poisoning and degeneration of a bio-culture may cause, by suggesting a well-planned distribution of the bio-culture, to renew the colonies in the whole system continuously. Example embodiments of the technology disclosed have the purpose of separating separable fat, oil and grease (FOG) from wastewater and reducing the amount of separable FOG which needs to be taken care of. In the process, a specially equipped wastewater tank, or system of wastewater tanks, is used. The equipment of the technology disclosed makes it possible to use the wastewater tank(s) simultaneously and concurrently as a separator and bioreactor. The separator function is a gravimetric separation process where FOG is collected in the usual way in the, for separated FOG intended, volume in the wastewater tank(s). The bioreactor function in the second chamber or second wastewater tank, provides for the FOG to be biologically broken down wholly or partly. To start the breaking down of FOG, a liquid culture of suitable microorganisms is added to a biological treatment zone of the tank. In example embodiments, the added two cultures of microorganisms include at least one of living bacteria, archaea and fungi.

In certain aspects of the technology disclosed, a bio-culture is mixed efficiently with the content in a wastewater tank(s) by air injection improving the oxygenation conditions in at least one biological treatment zone. In example embodiments, the bio-culture may be mixed by air injection in a layer, or zone, that lays under a floating scum layer in the separator/bio-reactor of a first and second chamber/wastewater tank. In certain example embodiments, two bio-cultures may be mixed by air injection in an intermediate layer that lays over a sludge layer and under a floating scum layer in the FOG separator/bio-reactor of the first and second chamber/wastewater tank. To maintain the biological process and/or to intensify the break down and mixing, air is blown in using a system for injecting and distributing the air. The addition of a liquid starter culture containing a suitable mixture of living microorganisms, which are evenly distributed by two separate air injection and distribution systems in each of the two bioreactors with the aid of the air injection.

Thus, the bioreactor function is aimed at further reducing the concentration of FOG in the wastewater of the second chamber/wastewater tank and is performed by the addition of two liquid cultures of microorganisms. In example embodiments, the two cultures of microorganisms each includes at least one of living bacteria, archaea and fungi. The growth of the microorganisms is increased by injecting air into the biological treatment zone for improved oxygenation and mixing of the wastewater. The method of the technology disclosed is adapted to increase the efficiency of the combined FOG separator and bioreactor process in the second chamber, or second wastewater tank.

The air injection into the biological treatment zone of the second chamber/tank may have several purposes, including:
- disintegrating the FOG layer to make the fat, oil and grease easily available for the microorganisms, i.e. increase the bio-availability of the FOG;
- achieving efficient oxygenation;
- achieving an even microorganism distribution by good mixing;
- even out pH-variations.

Today, a complete breakdown of fat in a combined fat separator and bioreactor is not achieved as the concentration of fat (e.g. defined by mg of hydrocarbons/l wastewater) flowing out of the second chamber/wastewater tank is not allowed to exceed set limit values. This is largely due to that the time window within which the biodegradation process is allowed to be active, is limited to the times of the day (usually at night) when no, or low amounts of, wastewater is added to the fat separator.

Efficient biological breakdown of FOG is promoted by high bioactivity, which in turn benefits from high turbulence while efficient FOG separation is disadvantaged by the same high turbulence, as this counteracts the gravimetric FOG separation function in the second chamber/wastewater tank. The approach for improved oxygenation/aeration according to the method proposed by the technology disclosed, if implemented in existing wastewater treatment tanks for reducing the amount of fat in wastewater, may lead to a deterioration in the FOG separation efficiency during periods when high amounts of wastewater is added to the tank which, in turn, may lead to that the concentration of FOG, or a specific undesirable constituents of the FOG in the wastewater, e.g. hydrocarbons, in the wastewater flowing out from the wastewater tank exceeds a certain limit, e.g. exceeds a specific threshold value set by the operator of the system, the community or the authorities. In example embodiments of the technology disclosed, the threshold value for the concentration is set to a specific value between 10 and 100 milligrams of hydrocarbons per liter of wastewater.

The above-mentioned threshold value for the concentration of FOG, and/or specific undesirable constituents of the wastewater, may be set to avoid clogging in the pipe system receiving the wastewater from the wastewater tank. As mentioned above, communities and authorities may also establish regulations regarding undesirable constituents. The undesirable constituent may be a biodegradable material, such as an inorganic or organic compound that participates or is involved in the metabolism of a microorganism. For example, the undesirable constituent may include nitrate, nitrite, phosphorous, ammonia, and the like, typically present in wastewater. The type and concentration of undesirable constituents present in the wastewater may also be site-specific.

The wastewater treatment tank, the outlet pipe construction and method according to the technology disclosed is adapted for allowing air injection also during periods when high amounts of wastewater are added to the wastewater tank, thereby improving the oxygenation conditions in the biological treatment zones. The improved oxygenation conditions have the effect that the efficiency or intensity of the biological treatment process is increased as the growth of microorganisms is stimulated.

An optimal biological degradation depends on the microorganisms having the right conditions for high growth. One important factor is nutrition, where the microorganisms require both carbon, phosphorus and nitrogen for their growth. This nutrition comes from the incoming wastewater, which means that the risk of nutritional deficiency of a particular substance differs depending on the composition of the incoming wastewater. For example, black water contains significantly more nitrogen than fat-rich wastewater from large kitchen.

The technology disclosed proposes a solution comprising two biological treatment processes which are dependent on each other in that a first biological treatment process, or pre-treatment process, in a first chamber of the tank, which is aimed at breaking down at least cellulose/paper affects and improves a second biological treatment process in a second chamber aimed at breaking down FOG.

The technology disclosed is based on the insight that better conditions for the gravimetric separation and biological degradation of FOG in the sub-systems is obtained, because the pre-treated wastewater entering the second sub-system has a more favorable composition than in a traditional fat separator if such a prior art fat separator would be used for the treatment of a mixture of black water from toilets containing paper/cellulose and fat-rich wastewater from kitchens. In embodiments, the technology disclosed relates to a system and method for process control in wastewater treatment. In particular, this system and method is suitable for, but not limited to use a parameter, or control a parameter, of at least one wastewater treatment process. As an example, a decision by the master control unit to change a parameter or process variable of, or extract a sample from, a treatment process of a sub-system may at least partly based on sensor data or process variables received from at least one other separate treatment process remotely located from the sub-system. In embodiments, the technology disclosed relates to a system and method for process control in wastewater treatment. In particular, this system and method is suitable for, but not limited to control a parameter of at least one wastewater treatment process for biologically breaking down wastewater. Benefits of the technology disclosed include that a spontaneous mutation of a composition of microorganisms initially added to a first treatment process, and that is indicated by received sensor data or process variables to improve the treatment process, may be extracted and used again in a second treatment process.

The benefits of the technology disclosed include that a spontaneous mutation of a composition of microorganisms initially added to a first treatment process, and that is indicated by received parameters or process variables to improve the treatment process, may be extracted and used again in a second treatment process. Further benefits of the technology disclosed include that a spontaneous mutation of a composition of microorganisms initially added to a first biological treatment process, e.g. a first wastewater treatment process of a first wastewater treatment system, and is indicated by received parameters or process variables to improve the treatment process, may be extracted from the first biological treatment process and used for a second biological treatment process of a second treatment system, e.g. a second wastewater treatment system remotely located from the first treatment system.

In embodiments, the system for wastewater treatment process control comprises a set of measuring means arranged to obtain a dataset, the dataset comprises a plurality of process variables related to a parameter of the wastewater treatment process; a prediction module arranged to receive the dataset and predict the parameter of wastewater treatment process based on a soft sensor.

In some embodiments, an optimization module may be arranged in data communication with the prediction module, troubleshooting module or prognosis module to optimize the plurality of process variables and parameter of wastewater treatment process with respect to at least one objective function.

To address the above-mentioned problems, the technology disclosed proposes using different cultures of microorganisms, e.g. different bacteria and/or archaea in the different sub-systems for optimized and more efficient biological biodegradation processes in respective sub-system to thereby avoid problems with clogging and foul-smelling odors.

In embodiments, the technology disclosed in addition provides for different environmental optimizations in the two separate sub-system to thereby provide for a more optimized and efficient biodegradation process in respective sub-system.

In embodiments, the two cultures of microorganisms are specially selected for breaking down an at least one of feces and paper and FOG, respectively. The first culture of microorganisms for breaking down at least one of feces and paper is then preferably different from the second culture of microorganisms for breaking down FOG.

In example embodiment, the first air injection and distribution system in a first sub-system using a first culture of microorganisms for breaking down at least one of cellulose and paper is configured to operate differently from a second air injection and distribution system in a second sub-system using a second culture of microorganisms for breaking down FOG.

In biotechnology, sensors which detect analytes thanks to a biological component, such as cells, protein, nucleic acid or biomimetic polymers, are called biosensors. Whereas a non-biological sensor, even organic, for biological analytes is referred to as sensor or nanosensor. This terminology applies for both in-vitro and in vivo applications. The encapsulation of the biological component in biosensors, presents a slightly different problem that ordinary sensors; this can either be done by means of a semipermeable barrier, such as a dialysis membrane or a hydrogel, or a 3D polymer matrix, which either physically constrains the sensing macromolecule or chemically constrains the macromolecule by bounding it to the scaffold.

Acoustic wave sensors are so named because their detection mechanism is a mechanical, or acoustic, wave. As the acoustic wave propagates through or on the surface of the material, any changes to the characteristics of the propagation path affect the velocity and/or amplitude of the wave. Changes in velocity can be monitored by measuring the frequency or phase characteristics of the sensor and can then be correlated to the corresponding physical quantity being measured. Virtually all acoustic wave devices and sensors use a piezoelectric material to generate the acoustic wave. Piezoelectricity refers to the production of electrical charges by the imposition of mechanical stress. The phenomenon is reciprocal. Applying an appropriate electrical field to a piezoelectric material creates a mechanical stress. Piezoelectric acoustic wave sensors apply an oscillating electric field to create a mechanical wave, which propagates through the substrate and is then converted back to an electric field for measurement.

In embodiments, the technology disclosed relates to system comprising a biological treatment zone or surface area for biologically treating fat, oil and/or grease by adding a culture of microorganisms for breaking down the fat, oil and/or grease (FOG). The system may comprise a control system or unit and at least one acoustic sensor such an acoustic wave sensor for obtaining sensor data, i.e. audio data, related to the biological treatment process for breaking down the fat, oil and/or grease. The control system or unit of the system may be configured to at least one of change at least one process variable, process scheme and/or process parameter related to the biological treatment process, e.g. as at least one process-related parameter value, and determine that a sample containing a culture of microorganisms should be collected from the biological treatment zone or surface area.

In embodiments, the decision by the control system or unit to change at least one process variable, process scheme and/or process parameter related to the biological treatment process may then be at least partly based on sensor data obtained by the at least one acoustic sensor. In embodiments, the that a sample containing a culture of microorganisms should be collected from the biological treatment zone or surface area may be at least partly based on sensor data obtained by the at least one acoustic sensor. In different embodiments, the system may be a wastewater treatment system, a waste management system, a fraction collector, a fraction separator, or a treatment plant.

Acoustic wave sensors are generally classified based on the propagation mode of the acoustic wave. Some common wave types and sensors are: Bulk acoustic wave (BAW): wave travels through the piezoelectric substrate, e.g.

Thickness shear mode resonator (TSM) or Shear-horizontal acoustic plate mode sensor (SH-APM), and Surface acoustic wave (SAW): wave travels on the surface of the substrate, e.g. Rayleigh surface waves sensor (generally known as a SAW sensor) or Shear-horizontal surface acoustic wave sensor (SH-SAW), also known as the surface transverse wave sensor (STW). SAW devices are particular among this group since surface acoustic waves include a vertical shear component, which greatly affects the velocity and amplitude of the wave along the delay line. This results in higher sensitivity among SAW devices than shear-horizontal wave sensors.

The basic operation of an acoustic wave sensor includes the following steps:
1. Sensor transduces an electric signal into an acoustic wave;
2. The acoustic wave is propagated, at which time it is affected by its environment;
3. Sensor transduces the acoustic wave back into an electric signal; and
4. The signals are compared to determine what changes the wave underwent during its propagation. These changes can then be used to determine the properties of the environment through which the acoustic wave propagated.

Acoustic wave sensors are very versatile in that they may be used alone or as part of a filtered sensor to measure many phenomena, including mass, temperature, pressure, stress, strain, torque, acceleration, friction, humidity, UV radiation, magnetic fields, and viscosity.

In embodiments, the technology disclosed relates to a method that includes detecting and identifying bacteria or microorganisms in a liquid medium. In certain embodiments, the bacteria or microorganisms being of the kind which produce signaling molecules in intercellular space, includes positioning a biosensor in the liquid medium. The biosensor may then have a biolayer matched to specific signaling molecules to be detected, whereby the biolayer is reactive thereto in a manner which varies operation of the sensor. Such variation of the operation of the biosensor is then detected to thereby determine the presence and purpose of the bacteria or microorganisms in the liquid medium. These embodiments may be well suited for monitoring certain environments which require the detection of various species of bacteria, including but not limited to airborne microorganisms.

Signaling molecules, characterized as autoinducers, diffuse more readily within the surrounding environment compared to the actual bacterium. The present invention is well suited for SAW (surface acoustic wave) geometries which are typically in the sub-micron range and can also function as RFID sensors which can be interrogated by a wireless system. SAW detectors can be small, simple in nature and provide microbial differentiation detection results in typically 10 seconds or less.

In certain embodiments, the present invention also provides acoustic wave-based sensors coated with specific bioreceptor molecules which can detect small signaling molecules from an originating species in real-time and quantify the acoustic wave sensor data due to the linear relationship between the mass of the signaling molecule and the velocity of the acoustic wave to thereby identify both the presence and the purpose of the originating species. Such biosensors can provide a medium for detecting harmful biological agents without coming into direct contact with the bacteria themselves. In addition, acoustic wave biosensor techniques permit quantification through the direct relationship between the concentrations of small signaling molecules in intercellular space to the relative amount of signaling source present. These embodiments of the technology disclosed are well-suited to be used for real time detection.

Soft sensor, or virtual sensor, is a common name for software where several measurements are processed together. Commonly soft sensors are based on control theory and also receive the name of state observer. There may be dozens or even hundreds of measurements. The interaction of the signals can be used for calculating new quantities that need not be measured. Soft sensors are especially useful in data fusion, where measurements of different characteristics and dynamics are combined. It can be used for fault diagnosis as well as control applications. Well-known software algorithms that can be seen as soft sensors include e.g. Kalman filters. More recent implementations of soft sensors use neural networks or fuzzy computing.

In embodiments, it is a further object of the technology disclosed to provide a method, a system and a wastewater tank for the treatment of wastewater containing a mixture of sanitary wastewater and FOG-rich wastewater, by using a plurality of cultures of microorganisms for first biologically pre-treating substances and/or constituents of sanitary wastewater to improve the starting conditions and efficiency of a subsequent process of biological treatment of FOG.

It is another object of the technology disclosed to provide a method, a system and a wastewater tank for reducing the risk of clogging, e.g. the clogging of pipes, in a wastewater tank, or in a system comprising a plurality of wastewater tanks. According to embodiments of the technology disclosed, the risk of clogging is reduced by biologically pre-treating substances and/or constituents of sanitary wastewater, e.g. cellulose, in a first bioprocess step to improve the gravimetric FOG separation efficiency in a subsequent process step.

It is yet another object of the technology disclosed to provide a method, a system and a wastewater tank for reducing the amounts of odor emission, e.g. foul-smelling gases, in a wastewater tank, or in a system comprising a plurality of wastewater tanks. According to embodiments of the technology disclosed, the amounts of odors is reduced by biologically pre-treating substances and/or constituents of sanitary wastewater, e.g. cellulose, in a first bioprocess to improve the gravimetric FOG separation efficiency in a subsequent process.

In embodiments, it is another object of the technology disclosed to provide a system and a wastewater tank adapted for pre-treating wastewater to improve both the conditions for a subsequent gravimetric FOG separation process and the efficiency in a subsequent bioprocess step for biologically degrading FOG by introducing at least two separate and different cultures of microorganisms which are added to two separate chambers, or two separate and connected wastewater tanks.

In embodiments, it is an object of the technology disclosed to reduce the amount of cellulose, and/or substances and constituents of cellulose, in a second chamber adapted for gravimetric FOG separation and biologically breaking down of FOG using a second culture of microorganisms, by adding, to a first chamber, a first culture of microorganisms which is selected and suitable for breaking down cellulose, and/or substances and constituents of cellulose, thereby reducing the amount of floating organic sludge entering the second chamber. The biological treatment process in the first chamber aimed at reducing the amount of cellulose, and/or substances and constituents of cellulose, and the floating organic sludge entering the second chamber is improving the gravimetric FOG separation efficiency in the second chamber. The biological treatment process in the first chamber for reducing the amount of cellulose, and/or substances and constituents of cellulose, may also be adapted for improving the efficiency of a subsequent biological treatment process for biologically degrading FOG in the second chamber.

In other embodiments, it is an object of the technology disclosed to reduce the amount of cellulose, and/or substances and constituents of cellulose, in a second wastewater tank adapted for gravimetric FOG separation and biologically breaking down of FOG using a second culture of microorganisms, by adding, to a first wastewater tank having its outlet connected to the second wastewater tank, a first culture of microorganisms which is selected and suitable for breaking down cellulose, and/or substances and constituents of cellulose, thereby reducing the amount of floating organic sludge entering the second wastewater tank. The biological treatment process in the first wastewater for reducing the amount of cellulose, and/or substances and constituents of cellulose, and the floating organic sludge entering the second wastewater tank is improving the gravimetric FOG separation efficiency in the second wastewater tank. The biological treatment process in the first wastewater for reducing the amount of cellulose, and/or substances and constituents of cellulose, may also be adapted for improving the efficiency of a subsequent biological treatment process for biologically degrading FOG in the second wastewater tank.

These and other objects are accomplished by providing an inventive system of plurality of wastewater tank, an inventive wastewater tank and the inventive multistage process for treatment of wastewater containing a mixture of sanitary wastewater, containing relatively high concentrations of feces and cellulose, and wastewater containing relatively high concentrations of fat, oil and grease (FOG), which is described below in detail.

In embodiments, the technology disclosed relates to a method for treatment of wastewater containing a mixture of sanitary wastewater containing feces and cellulose and wastewater containing fat, oil and grease (FOG), said method is comprising:
  a) receiving wastewater, through an inlet of a first chamber comprising a first biological treatment zone, wherein said received wastewater contains a mixture of sanitary wastewater and FOG-rich wastewater;
  b) adding a first microbe culture of microorganisms to the wastewater in the first biological treatment zone, wherein said first microbe culture of microorganisms is selected to be suitable for biologically breaking down constituents in sanitary wastewater;

c) injecting and distributing air into the wastewater in the first chamber, thereby increasing the biological activity and level of breaking down of constituents in the wastewater;

d) receiving, in a second chamber comprising a second biological treatment zone, wastewater from said first chamber which has been biologically pre-treated in the first chamber;

e) adding a second microbe culture of microorganisms to the wastewater in the second biological treatment zone, wherein said second microbe culture of microorganisms is selected to be suitable for biologically breaking down FOG; and f) injecting and distributing air into the wastewater in the second biological treatment zone, thereby increasing the biological activity and level of breaking down of FOG in the wastewater, wherein said biological pre-treatment by adding a first microbe culture of microorganisms and injecting and distributing air in the first chamber is breaking down constituents in sanitary wastewater to thereby improve the gravimetric FOG separation efficiency in the second chamber.

In embodiments, the first microbe culture of microorganisms is different from said first microbe culture of microorganisms and is selected to be suitable for biologically breaking down cellulose, thereby improving the efficiency of the gravimetric FOG separation process in the second chamber.

In embodiments, the above-defined method comprises adding, to a first chamber, a first microbe culture of microorganisms which is suitable for breaking down cellulose in that it contains added concentrations of at least one of J2 bacteria and bacillus amyloliquefaciens.

In embodiments, the above-defined method comprises adding, to a second chamber, a second microbe culture of microorganisms which is suitable for breaking down FOG in that it contains added concentrations of at least one of bacillus subtilis and bacillus licheniformis.

In embodiments, the above-defined tank further comprises at least one of at least one transverse wall and a filter in between the first and second chamber, wherein said at least one of at least one transverse wall and filter is configured for allowing for heavier substances and particles in the wastewater to sink to the bottom of the combined separator and biological treatment zone of the first chamber to form a sediment.

In embodiments of the above-defined tank, the first air injection and distribution system in said first chamber is configured to operate differently from said second air injection and distribution system in a second chamber comprising a second culture of microorganisms selected and suitable for breaking down FOG.

In embodiments, the wastewater treatment tank according to the technology disclosed has at least two separate chambers, where each of the at least two chambers is provided with a microbe culture of microorganisms and where each of the two cultures of microorganisms in each of the two chambers is selected and designed for biological treatment of wastewater from toilets and fatty water from kitchens, respectively.

In embodiments, the wastewater treatment tank according to the technology disclosed has two separate chambers, where the first and second culture of microorganisms added to the two chambers contains different cultures of microorganisms, but which are selected dependent on each other, thereby providing an improved biological treatment efficiency in at least the second chamber.

In other embodiments, the process for treating wastewater according to the technology disclosed is divided into two wastewater treatment tanks, where the first tank contains a first culture of microorganisms and is connected with an outlet pipe to the inlet pipe of a second tank which contains a second culture of microorganisms different from the first cultures of microorganisms. In this embodiment, the second culture of microorganisms is selected to be suitable for breaking down FOG and the first culture of microorganisms is selected to be suitable for breaking down cellulose with the objective of providing an improved treatment efficiency for a combined gravimetric FOG separation and FOG biological degradation process in the second tank. Further benefits of these embodiments may include a reduced risk for clogging and decreased amounts of foul-smelling odors.

In certain aspects, the technology disclosed relates to the structure and operation of a plurality of wastewater treatment systems each comprising a control system. In embodiments, the control systems for a first wastewater treatment system includes at least one sensor and/or detector configured to measure or detect the thickness of the fat/FOG cake created on the surface of a biological treatment zone of the first wastewater treatment system and provide an indication of the thickness of the fat/FOG cake to the controller of the first wastewater treatment system and/or a remotely-located master control unit.

In certain embodiments, the controller of the first wastewater treatment system is configured to continuously and/or periodically send sensor data or information a remotely-located control system of a second wastewater treatment system and/or a remotely-located master control unit. The sensor data or information may provide the remotely-located control system of a second wastewater treatment system and/or a remotely-located master control unit with an indication of the thickness of the fat/FOG cake. In response to receiving sensor data or information indicating a certain thickness of the fat/FOG cake, e.g. that the fat/FOG cake thickness exceeds or falls below a certain pre-defined threshold value, the remotely-located control system of the second wastewater treatment system and/or a remotely-located master control unit may be configured to determine that the biological treatment process is very effective, or not as effective as wanted.

In example embodiments and following the determination by the master control unit (or the second control system) that the biological treatment process is very effective, the remotely-located control system of the second wastewater treatment system and/or a remotely-located master control unit may be configured to send control data to the second wastewater system indicating that it is time to collect a liquid sample of microbe cultures of microorganisms from the biological zone of the first wastewater treatment system. The liquid sample of microbe cultures of microorganisms collected from the first wastewater treatment system may then be reused by being introduced into a second wastewater treatment system for breaking down wastewater.

In certain embodiments, process control parameter values or process variables used in the first biological treatment process for breaking down wastewater in the first wastewater treatment system determined to be effective may be collected and reused when introducing the collected liquid sample of microbe cultures of microorganisms into the second wastewater treatment system. The process control parameters or process variables used for the biological treatment process in the second wastewater treatment system may thereby be adapted and/or optimized for the specific liquid sample of microbe cultures of microorganisms collected from the first wastewater treatment system.

In example embodiments and following the determination by the master control unit and/or the second control system that the biological treatment process is less effective, e.g. that the thickness of the fat/FOG cake is increasing relatively rapidly, the remotely-located control system of the first wastewater treatment system and/or a remotely-located master control unit may be configured to send control data to the second wastewater system instructing the control system of the second wastewater system to change a process variable for a biological treatment process of the second wastewater treatment system.

In embodiments, a control system of the first wastewater system is configured to perform a comparison between the thickness of the fat/FOG cake with pre-defined threshold values to determine whether to change a process variable for a biological treatment process of the first wastewater treatment system.

In embodiments, the control system of the first wastewater treatment system may be configured to continuously and/or periodically send sensor data or information indicating the measured/detected thickness of the fat/FOG cake to a remotely-located control system of a second wastewater treatment system and/or a remotely-located master control unit.

In embodiments, the fat cake sensor data or information sent to a control system/controller of the first wastewater treatment system and/or a remotely-located master control unit may indicate to the control system/controller and/or the master control unit that the thickness of the fat cake created on the surface of the wastewater zone does not increase, or increases slowly, which in turn is an indication that the treatment process for breaking down wastewater is effective and that it is time to collect a liquid sample of microbe cultures of microorganisms from the wastewater tank of a first wastewater treatment system. The liquid sample of microbe cultures of microorganisms collected from the first wastewater treatment system may be reused by being introduced into a second wastewater treatment system for breaking down wastewater.

In some embodiments, the wastewater tank of the wastewater treatment system for biologically breaking down wastewater comprises a sensor/detector for detecting or measuring the thickness of the fat/FOG cake where the fat/FOG cake sensor/detector comprises a plurality of suspended solids sensors each disposed at different fixed locations within the wastewater tank. The plurality of suspended solids sensors may comprise one or more of optical sensors or ultrasonic sensors. In embodiments, the control system of a first wastewater treatment system may be configured to continuously and/or periodically send sensor data from the detector comprising a plurality of suspended solids sensors to a remotely-located control system of a second wastewater treatment system and/or a remotely-located master control unit.

In embodiments, the fat/FOG cake sensor/detector comprises at least one of an ultrasonic level sensor or a radar level sensor for determining the thickness of the fat/FOG cake. In embodiments, the control system of a first wastewater treatment system may be configured to continuously and/or periodically send sensor data from the fat/FOG cake sensor/detector comprising at least one of an ultrasonic level sensor or a radar level sensor to a remotely-located control system of a second wastewater treatment system and/or a remotely-located master control unit.

In some embodiments, the wastewater tank of the wastewater treatment system for biologically breaking down wastewater comprises a camera for determining the thickness of the fat/FOG cake where the fat/FOG cake camera is directed at the fat/FOG cake and may be placed above the wastewater surface or in the wastewater tank below the wastewater surface. In embodiments, the control system of a first wastewater treatment system may be configured to continuously and/or periodically send image data collected by the fat/FOG cake camera to a remotely-located control system of a second wastewater treatment system and/or to a remotely-located master control unit.

In some embodiments, the wastewater tank of the wastewater system comprises a sludge detector comprising a plurality of suspended solids sensors each disposed at different fixed locations within the wastewater tank. The plurality of suspended solids sensors may comprise one or more of optical sensors or ultrasonic sensors. In embodiments, the control system of a first wastewater treatment system may be configured to continuously and/or periodically send sensor data from the sludge detector comprising a plurality of suspended solids sensors to a remotely-located control system of a second wastewater treatment system and/or a remotely-located master control unit.

In some embodiments, the wastewater tank of the wastewater system comprises a sludge detector comprising a sensor that moves vertically responsive to a change in the level of liquid in the wastewater tank. The sludge detector may comprise one of an ultrasonic level sensor or a radar level sensor. In embodiments, the control system of a first wastewater treatment system may be configured to continuously and/or periodically send sensor data from the sludge detector comprising one of an ultrasonic level sensor or a radar level sensor to a remotely-located control system of a second wastewater treatment system and/or a remotely-located master control unit.

In embodiments, certain process control parameter values or process variables used in the process of breaking down wastewater in the first wastewater treatment system, which was identified to be effective, may be collected and reused when introducing the collected liquid sample of microbe cultures of microorganisms into the second wastewater treatment system. The process control parameters or process variables used for the biological treatment process in the second wastewater treatment system is thereby adapted and/or optimized for the liquid sample of microbe cultures of microorganisms collected from the first wastewater. In certain aspects, the technology disclosed thereby provides a package including both a liquid sample of microbe cultures of microorganisms and process control values/variables, where a second wastewater treatment system is provided with a liquid sample of microbe cultures of microorganisms performing well in a biological treatment process of a first wastewater system together with process control values/variables that are adapted/optimized for the liquid sample of microbe cultures of microorganisms which was collected from the first wastewater treatment system.

In embodiments, the control system of the wastewater treatment systems for breaking down wastewater includes a liquid level sensor configured to measure a level of liquid in the wastewater tank and provide an indication of the level of the liquid to a controller and a sludge detector configured to measure a position of an interface between sludge and solids-lean supernatant in the wastewater tank and to provide an indication of the position of the interface to the controller. In certain embodiments, the controller of a first wastewater system may be configured to perform a comparison between the level of the liquid and the position of the interface and at least one of send sensor data to a master control unit or a controller of a second wastewater system and control an amount of solids-lean supernatant removed from the tank during the decant stage based on the comparison. In some embodiments, the controller is further configured to control an amount of sludge removed from the vessel based at least in part on the position of the interface.

In some embodiments, the wastewater tank of the wastewater system comprises a sludge detector comprising a plurality of suspended solids sensors each disposed at different fixed locations within the wastewater tank. The plurality of suspended solids sensors may comprise one or more of optical sensors or ultrasonic sensors. In embodiments, the control system of a first wastewater treatment system may be configured to continuously and/or periodically send sensor data from the sludge detector comprising a plurality of suspended solids sensors to a remotely-located control system of a second wastewater treatment system and/or a remotely-located master control unit.

In some embodiments, the wastewater tank of the wastewater system comprises a sludge detector comprising a plurality of suspended solids sensors each disposed at different fixed locations within the wastewater tank. The plurality of suspended solids sensors may comprise one or more of optical sensors or ultrasonic sensors. In embodiments, the control system of a first wastewater treatment system may be configured to continuously and/or periodically send sensor data from the sludge detector comprising a plurality of suspended solids sensors to a remotely-located control system of a second wastewater treatment system and/or a remotely-located master control unit.

In some embodiments, the wastewater tank of the wastewater system comprises a sludge detector comprising a sensor that moves vertically responsive to a change in the level of liquid in the wastewater tank. The sludge detector may comprise one of an ultrasonic level sensor or a radar level sensor. In embodiments, the control system of a first wastewater treatment system may be configured to continuously and/or periodically send sensor data from the sludge detector comprising one of an ultrasonic level sensor or a radar level sensor to a remotely-located control system of a second wastewater treatment system and/or a remotely-located master control unit.

In some embodiments, the wastewater tank of the wastewater system comprises a liquid level sensor comprising an ultrasonic sensor. In some embodiments, the liquid level sensor comprises a plurality of sensors each disposed at different fixed levels in the wastewater tank.

In some embodiments, the liquid level sensor and sludge sensor are included in a same sensor. In some embodiments, the sludge detector comprises an ultrasonic level detector having an operating frequency between about 50 kHz and about 800 kHz.

In some embodiments, the sludge detector comprises a compressed high-intensity radar pulse sonar unit.

In accordance with another aspect, there is provided a method of facilitating control of a wastewater treatment system. The method comprises introducing a volume of wastewater into a sequencing batch reactor vessel of the wastewater treatment system, biologically treating the wastewater in the vessel, maintaining quiescent conditions in the vessel sufficient for solids in the wastewater to settle and form a blanket of settled sludge and a solids-lean supernatant, measuring a level of liquid in the vessel, providing an indication of the level of the liquid to a controller, measuring a position of an interface between the blanket of settled sludge and the solids-lean supernatant in the vessel, providing an indication of the position of the interface to the controller, performing a comparison between the level of the liquid and the position of the interface with the controller, decanting the solids-lean supernatant from the vessel, and controlling an amount of the solids-lean supernatant decanted from the vessel based on the comparison.

In some embodiments, the method further comprises introducing the wastewater into the vessel at a non-predetermined rate.

In accordance with an aspect, the technology disclosed relates to a sequencing batch reactor vessel configured to perform biological treatment of wastewater in a series of treatment stages including at least a plurality of the following stages: a fill stage, a biological reaction stage, a sludge settling stage in which solids settle from the wastewater to form a blanket of sludge and a solids-lean supernatant, a solids-lean supernatant decant stage, and an idle stage, the fill stage including introducing a non-predetermined amount of wastewater into the vessel. The control system of the sequencing batch reactor vessel may include at least one sensor and/or detector configured to measure or detect the thickness of the fat/FOG cake created on the surface of a biological treatment zone of the biological reaction stage, a liquid level sensor configured to measure a level of liquid in the vessel and provide an indication of the level of the liquid to a controller, and a sludge detector configured to measure a position of an interface between the blanket of sludge and the solids-lean supernatant in the vessel and to provide an indication of the position of the interface to the controller. The controller is configured to perform a comparison between the level of the liquid and the position of the interface and control an amount of the solids-lean supernatant removed from the vessel during the decant stage based on the comparison.

In some embodiments, ultrasonic level sensors which continuously move with the varying water level are utilized. In some embodiments, ultrasonic level sensors, radar level sensors, floating level sensors, and/or fixed level sensors or switches may be used alone or in combination to detect both the solids level and the water level in a wastewater treatment vessel, tank, or reactor. One or more liquid level sensors may be used in combination with a solids position detecting instrument or sensor so that the solids level and the position of the supernatant/solids interface in a wastewater treatment vessel, tank, or reactor can be determined. The sensors or switches may be connected either with a cable or may be wirelessly connected to a control system and can be moored or mounted within the wastewater treatment vessel, tank, or reactor so that they may float and ride with the varying water levels.

The invention claimed is:

1. A wastewater treatment system for biologically treating fat, oil and grease by adding a culture of microorganisms for partial biodegradation of the fat, oil and grease and/or breaking down the fat, oil and grease, said wastewater system comprises a control system, an air injection and distribution system for improving and controlling the biological treatment process and at least one sensor, wherein said at least one sensor is configured to obtain sensor data, audio data and/or image data, and said control system is configured to determine the thickness of a layer of fat, oil and grease on the surface of the biological treatment zone based on the obtained sensor data, audio data and/or image data, and wherein said control system is further configured to determine that a liquid sample containing a culture of microorganisms should be collected from the biological treatment zone based on the determined thickness of the layer of fat, oil and grease on the surface of the biological treatment zone.

2. The wastewater treatment system according to claim 1, wherein said control system is further configured to determine the rate of increase per unit of time of the thickness of the layer of fat, oil and grease on the surface of the biological treatment zone based on the obtained audio and/or image data and previously obtained sensor data, audio and/or image data indicating the thickness of the layer of fast, oil and grease on the surface of the biological treatment zone.

3. The wastewater treatment system according to claim 2, wherein said control system is configured to determine that a liquid sample containing a culture of microorganisms should be collected from the biological treatment zone based on the determined rate of increase per unit of time of the thickness of the layer of fat, oil and grease on the surface of the biological treatment zone.

4. The wastewater treatment system according to claim 1, wherein said control system is configured to determine that a liquid sample containing a culture of microorganisms should be collected based on the determined thickness of the layer of fat, oil and grease and/or rate of increase per unit of time of the thickness of the layer of fat, oil and grease on the surface of the biological treatment zone is below a certain value.

5. The wastewater treatment system according to claim 1, wherein said control system is configured to determine that a liquid sample containing a culture of microorganisms should be collected is based on the determined thickness of the layer of fat, oil and grease and/or rate of increase per unit of time of the thickness of the layer of fat, oil and grease on the surface of the biological treatment zone is below a certain pre-determined threshold value.

6. The system according to claim 1, wherein said control system is further configured to change at least one process variable, process scheme and/or process parameter used for controlling the biological treatment process based on said determined thickness of the layer of fat, oil and grease and/or rate of increase per unit of time of the thickness of the layer of fat, oil and grease on the surface of the biological treatment zone.

7. The system according to claim 1, wherein said control system is further configured to control the amount of air injected into the biological treatment zone per unit of time by the air injection and distribution system based on the determined thickness of the layer of fat, oil and grease and/or rate of increase per unit of time of the thickness of the layer of fat, oil and grease on the surface of the biological treatment zone.

8. The system according to claim 1, wherein said control system is further configured to receive control data or instruction data from another remotely located wastewater treatment system and/or a master control unit, wherein said control system is further configured to use said received control data to determine that a liquid sample containing a culture of microorganisms should be collected from the biological treatment zone.

9. The system according to claim 1, wherein said control system is further configured to receive control data or instruction data from another remotely located wastewater treatment system and/or a master control unit, wherein said control system is further configured to use said received control data or instruction data to change at least one process variable, process scheme and/or process parameter for controlling the biological treatment process.

10. The system according to claim 1, wherein said control system is further configured to receive control data or instruction data from another remotely located wastewater treatment system and/or a master control unit, wherein said control system is further configured to use said received control data or instruction data to change the amount of air injected into the biological treatment zone per unit of time by the air injection and distribution system.

11. The wastewater treatment system according to claim 1, wherein said at least one sensor includes at least one of a camera, an optical sensor, a microphone, an acoustic sensor, an ultrasonic sensor, and a radar sensor for obtaining the sensor data, audio data and/or image data.

12. The wastewater system according to claim 1, wherein said control system is configured to use at least one of soft sensor data, historic data, machine learning algorithms, deep learning algorithms and artificial intelligence for processing said obtained sensor data, audio data and/or image data in order to determine the thickness of the layer of fat, oil and grease and/or rate of increase per unit of time of the thickness of the layer of fat, oil and grease on the surface of the biological treatment zone.

13. The wastewater system according to claim 1, wherein said wastewater treatments system is further configured to transmit said obtained sensor data, audio data and/or image data to a remotely located processor configured to use at least one of soft sensor data, historic data, machine learning algorithms, deep learning algorithms and artificial intelligence for processing said obtained sensor data, audio data and/or image data to determine the thickness of the layer of fat, oil and grease and/or rate of increase per unit of time of the thickness of the layer of fat, oil and grease on the surface of the biological treatment zone.

14. The wastewater system according to claim 1, wherein said control system is further configured to determine that a liquid sample containing a culture of microorganisms should be collected from the biological treatment zone is, in addition to the determining of the thickness of the layer of fat, oil and grease on the surface of the biological treatment zone, also based on sensor data obtained by a temperature sensor indicating a certain temperature of the wastewater in the biological treatment zone and/or a certain rate of increase or decrease of the temperature in the wastewater in the biological treatment zone.

15. A method in a wastewater treatment system for biologically breaking down fat, oil and grease by adding a culture of microorganisms to a biological treatment zone of the biological treatment system, said biological treatment system comprising a control system, an air injection and distribution system for improving and controlling the biological treatment process and at least one sensor, said method comprising the steps of:
   a) obtaining sensor data, audio data and/or image data from said at least one sensor, wherein said sensor data, audio data and/or image data is indicating the current thickness of a layer of fat, oil and grease on the surface of the biological treatment zone; and
   b) determining, by the control system or a remotely located control unit communicatively coupled to the control system, the thickness of the layer of fat, oil and grease on the surface of the biological treatment zone, said method is further comprising the step of
   c) determining, by the control system, that a liquid sample containing a culture of microorganisms should be collected from the biological treatment zone, wherein said determining is based on the determined thickness of the layer of fat, oil and grease.

16. The method according to claim 15, said method further comprising:
 a) determining, by the control system, the rate of increase per unit of time of the thickness of the layer of fat, oil and grease on the surface of the biological treatment zone, wherein said rate of increase per unit of time of the thickness of the layer of fat, oil and grease is determined based on the obtained sensor data, audio data and/or image data and previously obtained sensor data, audio data and/or image data indicating the thickness of the layer of fast, oil and grease on the surface of the biological treatment zone; and
 b) determining, by the control system, that a liquid sample containing a culture of microorganisms should be collected from the biological treatment zone, wherein said determining is based on the determined rate of increase per unit of time of the thickness of the layer of fat, oil and grease.

17. The method according to claim 15, wherein said step of determining that a liquid sample containing a culture of microorganisms should be collected from the biological treatment zone is based on the determined thickness of the layer of fat, oil and grease and/or rate of increase per unit of time of the thickness of the layer of fat, oil and grease is below a certain value.

18. The method according to claim 15, wherein said step of determining the thickness of the layer of fat, oil and grease and/or rate of increase per unit of time of the thickness of the layer of fat, oil and grease on the surface of the biological treatment zone is at least partly performed by a processor using at least one of soft sensor data, historic data, machine learning algorithms, deep learning algorithms and artificial intelligence for processing said obtained sensor data, audio data and/or image data in order to determine the thickness of the layer of fat, oil and grease and/or rate of increase per unit of time of the thickness of the layer of fat, oil and grease on the surface of the biological treatment zone.

19. The method according to claim 15, wherein said sensor data, audio data and/or image data is transmitted to a remotely located processor and said step of determining the thickness of the layer of fat, oil and grease and/or rate of increase per unit of time of the thickness of the layer of fat, oil and grease on the surface of the biological treatment zone is at least partly performed by the remotely located processor using at least one of soft sensor data, historic data, machine learning algorithms, deep learning algorithms and artificial intelligence for processing said obtained sensor data, audio data and/or image data in order to determine the thickness of the layer of fat, oil and grease and/or rate of increase per unit of time of the thickness of the layer of fat, oil and grease on the surface of the biological treatment zone.

20. The method according to claim 15, said method further comprising:
 a) controlling, by the control system, the amount of air injected into the biological treatment zone per unit of time by the air injection and distribution system based on the determined thickness of the layer of fat, oil and grease and/or rate of increase per unit of time of the thickness of the layer of fat, oil and grease on the surface of the biological treatment zone.

21. The method according to claim 15, further comprising:
 a) receiving, by the control system and from another wastewater treatment system and/or a master control unit, control data or instruction data; and
 b) determining, by the control system, that a liquid sample containing a culture of microorganisms should be collected from the biological treatment zone, wherein said determining is based on the received control data or instruction data.

22. The method according to claim 15, further comprising:
 a) receiving, by the control system and from another wastewater treatment system and/or a master control unit, control data or instruction data; and
 b) controlling, by the control system, the amount of air injected into the biological treatment zone per unit of time by the air injection and distribution system based on the received control data or instruction data.

23. The method according to claim 15, wherein said step of determining that a liquid sample containing a culture of microorganisms should be collected from the biological treatment zone is, in addition to the determining of the thickness of the layer of fat, oil and grease on the surface of the biological treatment zone, also based on sensor data obtained by a temperature sensor indicating a certain temperature of the wastewater in the biological treatment zone and/or a certain rate of increase or decrease of the temperature in the wastewater in the biological treatment zone.

\* \* \* \* \*